Jan. 19, 1965 HENRI-GEORGES DOLL 3,166,709

METHOD AND APPARATUS FOR PROVIDING IMPROVED VERTICAL RESOLUTION IN INDUCTION WELL LOGGING INCLUDING ELECTRICAL STORAGE AND DELAY MEANS

Filed April 17, 1959 10 Sheets-Sheet 1

Henri-Georges Doll
INVENTOR.

BY Robert Hockfield
ATTORNEY

METHOD AND APPARATUS FOR PROVIDING IMPROVED VERTICAL RESOLUTION IN INDUCTION WELL LOGGING INCLUDING ELECTRICAL STORAGE AND DELAY MEANS

Filed April 17, 1959 10 Sheets-Sheet 2

Henri-Georges Doll
INVENTOR.

BY Robert Hockfield
ATTORNEY

Henri-Georges Doll
INVENTOR.

BY Robert Hochfield
ATTORNEY

Jan. 19, 1965 HENRI-GEORGES DOLL 3,166,709

METHOD AND APPARATUS FOR PROVIDING IMPROVED VERTICAL RESOLUTION IN INDUCTION WELL LOGGING INCLUDING ELECTRICAL STORAGE AND DELAY MEANS

Filed April 17, 1959 10 Sheets-Sheet 4

Henri-Georges Doll
INVENTOR.

BY Robert Hockfield
ATTORNEY

Henri-Georges Doll
INVENTOR.

BY Robert Hockfield
ATTORNEY

Jan. 19, 1965 HENRI-GEORGES DOLL 3,166,709

METHOD AND APPARATUS FOR PROVIDING IMPROVED VERTICAL RESOLUTION IN INDUCTION WELL LOGGING INCLUDING ELECTRICAL STORAGE AND DELAY MEANS

Filed April 17, 1959 10 Sheets-Sheet 6

Henri-Georges Doll
INVENTOR.

BY Robert Hockfield
ATTORNEY

Henri-Georges Doll
INVENTOR.

BY Robert Hockfield

ATTORNEY

Henri-Georges Doll
INVENTOR.

BY Robert Hockfield
ATTORNEY

Jan. 19, 1965 HENRI-GEORGES DOLL 3,166,709

METHOD AND APPARATUS FOR PROVIDING IMPROVED VERTICAL RESOLUTION IN INDUCTION WELL LOGGING INCLUDING ELECTRICAL STORAGE AND DELAY MEANS

Filed April 17, 1959

10 Sheets-Sheet 9

Henri-Georges Doll
INVENTOR.

BY Robert Hockfield

ATTORNEY

Henri-Georges Doll
INVENTOR.

BY Robert Hockfield
ATTORNEY 3,166,709
METHOD AND APPARATUS FOR PROVIDING IMPROVED VERTICAL RESOLUTION IN INDUCTION WELL LOGGING INCLUDING ELECTRICAL STORAGE AND DELAY MEANS Henri-Georges Doll, Ridgefield, Conn., assignor to Schlumberger Well Surveying Corporation, Houston, Tex., a corporation of Texas
Filed Apr. 17, 1959, Ser. No. 807,221
39 Claims. (Cl. 324—6)

This invention relates to methods and apparatus for investigating earth formations traversed by a borehole and, more particularly, pertains to new and improved methods and apparatus for electromagnetic well logging.

Generally speaking, in electromagnetic well logging, commonly referred to as "induction logging," a transmitter coil energized by alternating current is lowered into a well or borehole and indications are obtained of the influence of surrounding formations on the electromagnetic field established by the coil. Usually such indications are obtained by observing the voltage induced in a receiver coil lowered into the borehole in coaxial relationship with the transmitter coil and longitudinally spaced apart therefrom. Where a single transmitter coil and a single receiver coil are utilized together, the arrangement is referred to as a "two-coil" system. Greatly improved performance is achieved by utilizing the focussing techniques disclosed in Patent No. 2,582,314, which issued to H. G. Doll on January 15, 1952, and apparatus embodying such techniques has gained a considerable measure of commercial success.

It is an object of the present invention to provide new and improved apparatus for investigating earth formations traversed by a borehole whereby induction logs of improved accuracy and reliability can be obtained.

Another object of the invention is to provide new and improved induction logging methods and apparatus which afford sharp and clearly defined responses to thin beds.

A further object of the present invention is to provide new and improved methods and apparatus for induction well logging featuring improved vertical resolution.

Another object of the present invention is to provide new and improved methods and apparatus for induction logging in which the effects of adjacent or shoulder beds on the conductivity reading for a particular bed under investigation are minimized.

An additional object of the invention is to provide new and improved induction logging methods and apparatus featuring improved vertical resolution and/or minimum response to shoulder beds while maintaining desired lateral penetration characteristics.

Still another object of the invention is to provide new and improved methods and apparatus for induction well logging affording improved vertical resolution without undesirably increasing the complexity of the instrument passed through the well or borehole.

Yet another object of the invention is to provide new and improved induction well logging apparatus featuring improved vertical resolution without requiring an increase in length of the borehole instrument.

These and other objects of the invention are obtained by disposing electromagnetic exploring means having given geometrical characteristics at each of a plurality of levels in a borehole penetrating the earth formations to be investigated to derive simultaneously a corresponding plurality of electrical signals representative of electrical characteristics of the adjacent earth formations. The plurality of electrical signals are combined to provide an output signal and indications are obtained in response to the output signal.

More specifically, an alternating magnetic field is established in the borehole at successive locations to produce alternating electric current flow in earth formations adjacent to each location thereby to induce a resultant alternating magnetic field in a zone located in the borehole in fixed spacial relation to each such location, and an electrical signal is derived in response to the resultant alternating magnetic field. The electrical signal is stored or memorized so that a plurality of reproduced signals may be obtained simultaneously. Each of the reproduced signals corresponds to one location in the borehole and indications are obtained in response to a predetermined algebraic combination of selected fractions of the reproduced signals.

Apparatus constructed according to the present invention for performing the above described methods comprises a coil system adapted to be lowered into a borehole. A source of electrical energy is connected to the coil system thereby to generate an electromagnetic field and signal means coupled to the coil system is provided to derive a signal in response to an electrical characteristic of material adjacent to the coil system. Appropriate means are utilized for displacing the coil system through the borehole so that the signal means provides an information signal representing an electrical characteristic of the earth formations as a function of the position of the coil system in the borehole. Signal storage means provides a reproducible record of the information signal and reproducing means is associated with the signal storage means simultaneously to derive a plurality of reproduced signals corresponding to spaced locations in the borehole. The apparatus further comprises computing means for deriving an output signal representing a selected combination of the reproduced signals, and indicating means responsive to the output signal.

In accordance with various embodiments of the invention, the coil system may include any number of coils such as a single coil, or a single transmitter coil and a single receiver coil, or any combination of transmitters and receivers.

Further, signals corresponding to two or more stations or locations in the borehole may be employed.

The novel features of the present invention are set forth with particularity in the appended claims. The present invention, both as to its organization and manner of operation, together with further objects and advantages thereof, may best be understood by reference to the following description taken in connection with the accompanying drawings in which:

FIG. 1 is a schematic diagram of an induction well logging system constructed according to the present invention;

FIG. 1*a* is a detailed circuit diagram of one of the elements included in the apparatus shown in FIG. 1.

Figures 1, 1A:
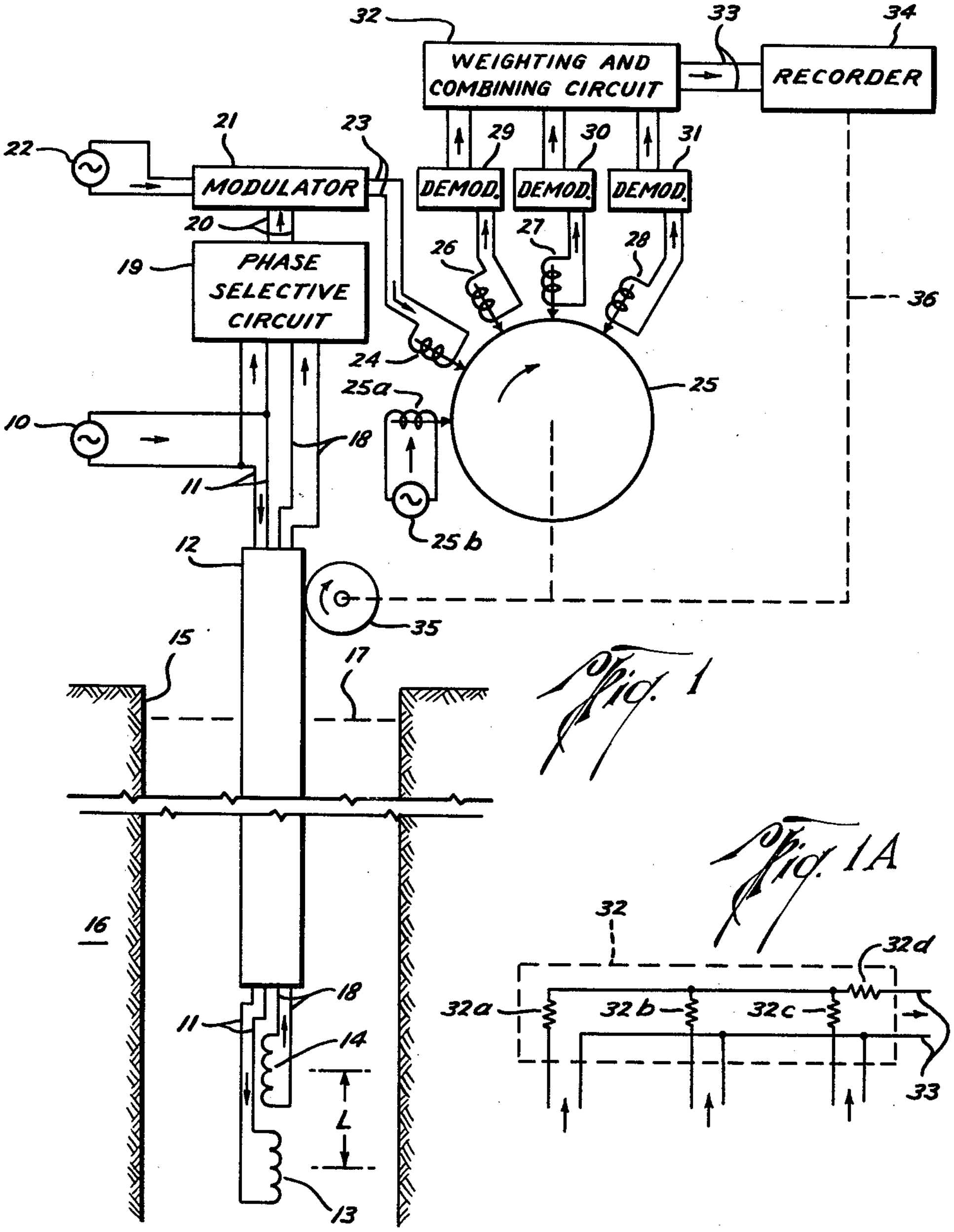

In FIG. 1 of the drawings is shown a source 10 of alternating potential connected by conductors 11 of an armored electric cable 12 to a transmitter coil 13 of a coil system which also includes a receiver coil 14. Coil system 13, 14 is suspended by the cable 12 in a borehole 15 which traverses earth formations 16 and which may be empty or filled with the usual drilling mud 17 as shown.

Receiver coil 14 is spaced longitudinally from transmitter coil 13 and is connected to conductors 18 of cable 12 which extend to the surface of the earth. The two-coil system 13, 14 may be of a type such as described in an article by H. G. Doll entitled "Introduction to Induction Logging and Application to Logging of Wells Drilled With Oil-Base Mud," published in the Petroleum transactions of the AIME in June of 1949. As there discussed, electromagnetic means 13, 14 provides a signal at leads 18 proportional to the conductivity of earth formations 16.

Conductors 18 are connected to an input circuit of a phase selective circuit 19 which receives a reference signal from source 10 and provides at its output leads a signal of selected phase. For example, circuit 19 may be of a type such as disclosed in Patent No. 2,788,483, of H. G. Doll, which selects from the signal at leads 18 only that component representing conductivity, to the exclusion of signal components of other phases (i.e., susceptibility signal components). Thus, the signal which appears at output leads 20 accurately represents the conductivity of formations 16.

The coil system 13, 14 is lowered and raised in the borehole 15 by means of cable 12 and a winch (not shown) in the usual manner and thus by recording the signal at leads 20 as a function of depth, a continuous log of earth formation conductivity may be obtained in a known manner.

To process the signal at leads 20 in accordance with the present invention, that signal is supplied to a conventional modulator 21 energized by a carrier signal source 22 to provide at leads 23 a modulated signal. Leads 23 are connected to a recording head 24 operatively associated in a known manner with a recording drum 25 of magnetic material. Three, conventional, magnetic pickup heads 26, 27 and 28 are operatively associated with the drum 25. They are spaced from recording head 24 and from one another in a manner to be apparent from the discussion to follow. The usual form of erasing head **25*a* is also associated with the drum 25 and is connected to an alternating current source 25*b***.

The pickup heads are connected to individual demodulators 29, 30 and 31 of conventional construction, all of which are coupled to a weighting and combining circuit 32 which may, for example, be a resistive network of the type shown in FIG. 1*a* comprised of individual resistors **32*a*, 32*b* and 32*c* connected to a common resistor 32*d*. Network 32 is thus an analogue computer arranged to obtain a predetermined fraction of the amplitude of the signal from each of the demodulators 29, 30 and 31 and to combine algebraically the derived signals, which may be either positive or negative, to provide an output signal at leads 33. Leads 33 are connected to a conventional recorder 34 in which the recording medium is driven by a measuring wheel 35 which engages cable 12 and is mechanically coupled to recorder 34 via an appropriate linkage, schematically represented by broken-line 36. The linkage 36 is also coupled to drum 25 so that the drum is also displaced in synchronism with movement of the coil system 13, 14 through the borehole 15**.

As discussed earlier, the signal developed at leads 20 constitutes a quantitative determination of the conductivity of earth formations 16. The vertical response characteristic for the portion of the apparatus providing this signal is represented by the curve 40 in FIG. 2 which is a plot for a particular set of coils 13, 14 showing the relative contribution of the different layers of ground, i.e., a plurality of horizontal depths of unit thickness, as a function of vertical distance with respect to the center of the coil system 13, 14.

Since a two-coil sonde such as the system 13, 14 in FIG. 1, has a very large reactive component, usually a bucking transformer or coil is employed to reduce the amplitude of that component compared to the conductive signal component; however, for simplicity of the explanation of the present invention this has been omitted. Further, cable 12 may introduce significant phase errors and thus circuit 19 may conveniently be positioned within a pressure-tight housing to which the coils 13, 14 are physically connected, so that the entire assembly can be passed through the borehole.

In the operation of apparatus embodying the present invention, the signal at leads 20 modulates the carrier signal from source 22 and the modulated signal is supplied to recording head 24. Since magnetic drum 25 rotates in synchronism with movement of coil system 13, 14 through the borehole 15, a magnetic representation of the induction log signal is placed on the drum as a function of depth. The modulated signal is thus stored so that, subsequently, magnetic pickup heads 26, 27 and 28 simultaneously derive three signals whose instantaneous amplitude represent the induction log signals corresponding to a plurality of longitudinally spaced stations or locations in the borehole. After demodulation, the three signals pass into unit 32 where predetermined fractions of their amplitudes are arithmetically combined and the resulting output signal at leads 33 is supplied to recorder 34 in which a continuous log as a function of depth in borehole 15 is inscribed. Of course, after the signals stored on drum 25 are utilized, the information carried by the drum is deleted by erasing equipment **25*a*, and new information may be placed on the drum by recording head 24**.

In other words, as the coil system 13, 14 is drawn upwardly through the borehole 15, a signal representing the induction log signal is memorized so that three signals representing the induction log signals at a center station $m_0$, a station $m_1$ below the center station and a station $m_1'$ above the center station are obtained simultaneously. In circuit 32, predetermined fractions or weights $\theta_1$ and $\theta_1'$ of the amplitudes of the signals cordesponding to the stations $m_1$ and $m_1'$ are subtracted from a predetermined fraction or weight $\theta_0$ of the amplitude of the signal corresponding to the center station $m_0$. The station locations and weights may be selected in a manner to be discussed hereinafter. It is assumed for this part of the discussion, however, that $m_1$ and $m_1'$ are spaced 80″ from $m_0$, that $\theta_0=1.270$ and that $\theta_1=\theta_1'=0.135$. Thus, in FIG. 2, while curve 40 represents the vertical investigation characteristics for the apparatus at station $m_0$, curves **40*a* and 40*b* represent the corresponding, weighted characteristics at stations $m_1$ and $m_1'$. Since the signals for stations $m_1$ and $m_1'$ are subtracted from the signal at $m_0$, the former are shown in opposite polarity sense relative to the latter. Curve 40*c* represents curve 40 increased by its weighting factor $\theta_0$. By graphically combining curves 40*c*, 40*a* and 40*b***, the resulting characteristic illustrated by curve 41 is obtained. It is therefore apparent that the equipment which provides the processed signal, supplied over leads 33 to the recorder 34, has an effective vertical investigation characteristic represented by curve 41. As compared to equipment without signal processing (curve 40), a substantial improvement in the vertical resolution of the apparatus is achieved.

In addition, a comparison of curves 40 and 41 reveals that apparatus embodying the present invention has a reduced response to beds adjacent to a particular one whose conductivity is being measured. For example, it will be noted that curve 41 has a value very close to zero from plus or minus sixty inches outwardly. Consequently, while a highly conductive shoulder bed at sixty inches from the center of the main bed might undesirably influence the conductivity reading in apparatus which produces curve 40, obviously apparatus exhibiting the response characteristic of curve 41 will be appreciably less affected, if not altogether unaffected by the shoulder bed.

Figure 3:
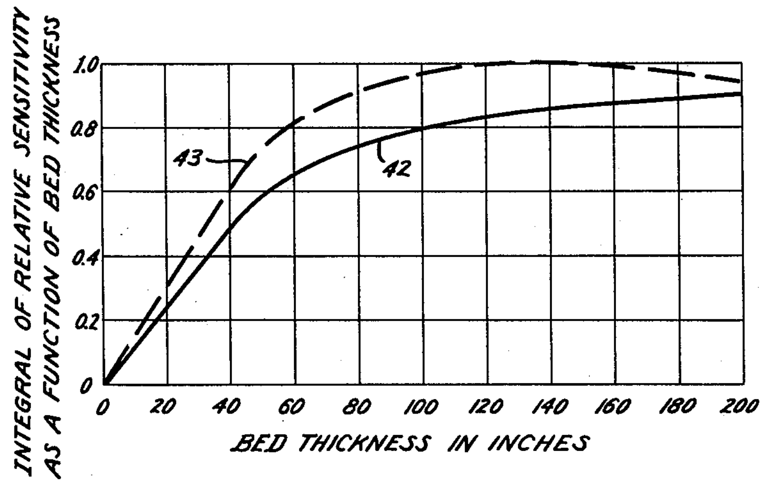
FIGS. 2 and 3 are graphs showing typical vertical sensitivity characteristics for the apparatus illustrated in FIG. 1.

The degree of improvement may perhaps be better observed by referring to FIG. 3 in which curve 42 is a plot of relative response as a function of bed thickness for the portion of the apparatus providing the induction log signal at leads 20. By storing and combining signals as described above, the resulting characteristic is of a nature illustrated by curve 43. A comparison of curves 43 and 42 clearly demonstrates that the methods and apparatus according to the present invention more accurately denotes the conductivity of relatively thin beds.

It is, therefore, evident that the present invention affords improved vertical resolution and reduced response to shoulder beds while the complexity of the coil system 13, 14, and its size are unaffected. This, of course, is an important attribute of the invention since complex and unduly large borehole instruments are generally to be avoided. However, as will be clear from discussions to follow, the invention is also applicable to coil systems featuring focussing techinques whereby marked improvements in vertical investigation characteristics are afforded.

Moreover, it has been found that although vertical resolution is improved and shoulder bed response decreased, the radial or lateral investigation characteristics are not affected. Thus, where a coil system provides deep lateral penetration, its use in combination with apparatus embodying the invention does not impair this desirable feature.

To summarize, source 10 and coil 13 operate to set up an alternating magnetic field at one location in borehole 15 to produce alternating electric current flow in the adjacent earth formations 16 thereby to induce a resulting alternating magnetic field in a first zone in the borehole defined by coil 14 and thus in fixed spacial relation to the first-mentioned location. From coil 14 a first signal is derived in response to the resultant alternating magnetic field in the first zone. By means of cable 12, the coil system 13, 14 is displaced from the first location to another longitudinally spaced location where source 10 and coil 13 operate to establish an alternating magnetic field. Thus, alternating electric current flows in adjacent earth formations 16 and a resulting alternating magnetic field is induced in a second zone. Since coils 13 and 14 are fixed relative to one another, the second zone is in the same spacial relation to the other location as the first zone is to the one location and a second signal is derived from coil 14 in response to the resultant magnetic field. By means of cable 12, the coil system may be displaced to yet another location for which a third signal is derived. The first, second and third signals are utilized to develop three corresponding signals whose amplitudes have a predetermined relationship to one another and indications are obtained in response to a selected algebraic combination of the instantaneous amplitudes of the three corresponding signals thereby to provide improved investigation characteristics for the apparatus.

In demonstrating one procedure that may be employed to select the spacings among the three stations from which the signals are to be combined and to determine the relative weights to be utilized, it is assumed that the geometrical factor data for the portion of the system up to leads 20, exclusive of storage and computation, is known. For example, the curves 40 and 42 were obtained for a two-coil system in which the coils were spaced apart a distance of forty inches.

If a bed thickness is assumed at which one hundred percent response is desired, and the distance between computing levels is assumed, the weights can be easily determined. Using these weights and the means of calculations described hereinafter, a plot of the resulting integrated vertical geometrical factor versus bed thickness is obtained and if this reveals some undesired characteristic, for example, a range of bed thickness for which the response will exceed one hundred percent a new design criterion can be established and the calculation repeated.

Figures 4, 5, 6:
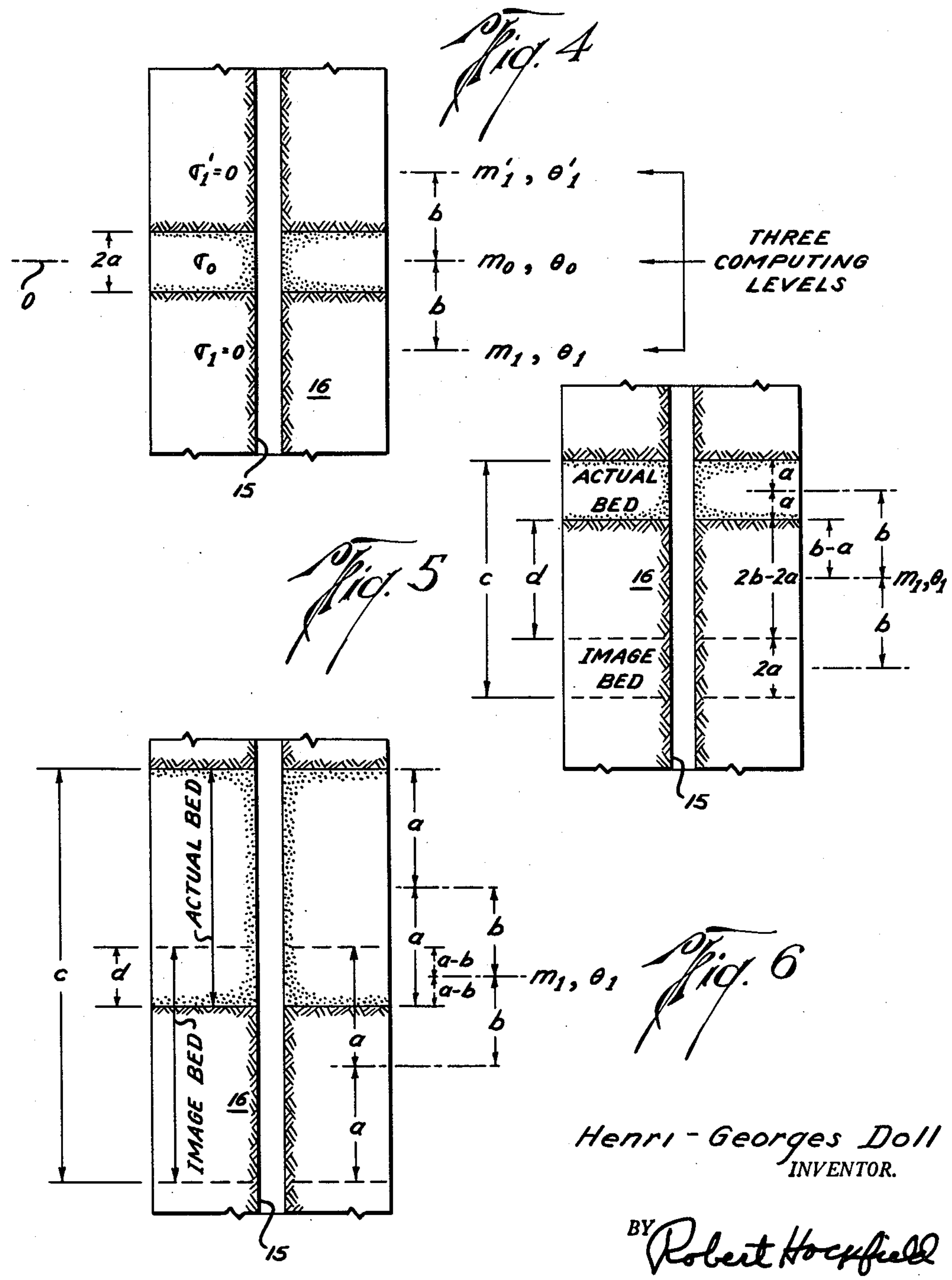
FIGS. 4, 5 and 6 are simplified representations of earth formations traversed by a borehole useful in understanding certain computations employed in the design of apparatus embodying the present invention.

In FIG. 4 is shown a simplified diagram of formations 16 penetrated by borehole 15 and comprised of a single conductive bed of conductivity $\sigma_0$ and of thickness $2a$ surrounded by nonconductive shoulders $\sigma_1$ and $\sigma_1'$. Three computing levels are diagrammatically illustrated at levels $m_0$ interposed between lower and upper levels $m_1$ and $m_1'$, the corresponding computing weights being designated $\theta_0$, $\theta_1$ and $\theta_1'$.

As described in the article "Introduction to Induction Logging and Application to Logging of Wells Drilled With Oil-Base Mud" referred to earlier, a unit ground loop of radius $r$, and situated at an altitude $z$ with respect to the center O of the coil system contributes to the total signal E an elementary signals $e$ given by:

$$e=KgC \quad (1)$$

in which C is the conductivity of the unit loop, and K an apparatus constant. The factor $g$ depends exclusively on the geometry, that is, on the dimension and position of the unit loop. For that reason, it will be referred to as the "geometrical factor" of the unit loop, or as the "unit geometrical factor." This portion of the discussion refers to an induction logging system without signal storage and computation.

Thus, to determine the system investigation characteristics, the geometrical factor for various cases of interest must be obtained. One such case is the response to a bed of a given thickness when the coil system 13, 14 is located in the center of the bed; this is indicated by the "integrated vertical geometrical factor" referred to above.

The portion of the system in FIG. 1 denoted by numerals 24 through 28 stores a portion of the log in its memory and reads the log at three levels, $m_1$, $m_0$ and $m_1'$. Circuit 32 applies the proper coefficients to these readings and subtracts the values at $m_1$ and $m_1'$ from that at $m_0$.

Thus:

$$M=\theta_0 m_0-\theta_1 m_1-\theta_1' m_1' \quad (2)$$

Where $M$=the reading after computation, and $\theta_0$, $\theta_1$, and $\theta_1'$ represent the relative weights of the coefficients. For the case of a bed of thickness $2a$, with $m_0$ at the center of the bed:

$$M=G(2a)\sigma_0=\theta_0 g_0\sigma_0-\theta_1 g_1\sigma_0-\theta_1' g_1'\sigma_0 \quad (3)$$

Where $G(2a)$=geometrical factor for a bed $2a$ thick, with computation $g_0=g(2a)$=geometrical actor for a bed $2a$ thick with the coil system at its center $g_1$=geometrical factor for a bed $2a$ thick with the coil system at $m_1$ $g_1'$=geometrical factor for a bed $2a$ thick with the coil system at $m_1'$ $\sigma_0$=conductivity of the bed (Note that all geometrical factors referred to above are integrated vertical geometrical factors.) Dividing by $\sigma_0$ (a constant):

$$G(2a)=\theta_0[g(2a)]-\theta_1 g_1-\theta_1' g_1' \qquad (4)$$

The term $g(2a)$ is merely the integrated vertical geometrical factor for the particular coil system used (without computation) for a bed $2a$ thick when the coil system 13, 14 is in the center of the bed, and is therefore a known quantity.

Since in this example, the coil system 13, 14 is symmetrical, $g_1'=g_1$ and $\theta_1'=\theta_1$. Therefore, Equation 4 becomes:

$$G(2a)=\theta_0[g(2a)]-2\theta_1 g_1 \qquad (5)$$

To obtain $g_1$, the following analysis may be used. If the coil system 13, 14 is assumed to be positioned at $m_1$, a distance $b$ below the center line of the bed as shown in FIG. 5, the geometrical factor can be calculated for the coil system 13, 14 located at the center of a bed of thickness $c$, and the geometrical factor of a bed of thickness $d$ can be subtracted. This will give the integrated vertical geometrical factor for two beds, each of thickness $2a$, with the center of each bed displaced a distance $b$ from the coil system. Since the particular coil system under discussion is symmetrical and therefore has a symmetrical vertical investigation characteristic, the geometrical factor of one such bed is just half of this value.

Thus:

$$2g_1=g(c)-g(d) \qquad (6)$$

Since $$d=2b-2a \text{ (from FIG. 5)}$$

and $$c=2a+d+2a$$
$$c=4a+2b-2a$$
$$c=2a+2b$$

Therefore $$2g_1=g(2a+2b)-g(2b-2a) \qquad (7)$$

Combining Equations 5 and 7:

$$G(2a)=\theta_0[g(2a)]-\theta_1[g(2a+2b)-g(2b-2a)] \qquad (8)$$

For example, it may be desired to have one hundred percent response for a bed thickness three times the coil spacing (3L) with the base of the computation ($2b$) of four times the spacing.

Thus:

$$G(2a)=1 \text{ when } 2a=3L, \text{ and } 2b=4L \qquad (9)$$

(where $L$=coil spacing).

Substituting Equation 9 in Equation 8:

$$1=\theta_0[g(3L)]-\theta_1[g(7L)-g(L)]$$

Using Table I (below):

$$1=\theta_0[.833333]-\theta_1[.928571-.50000]$$
$$1=\theta_0[.833333]-\theta_1[.428571] \qquad (10)$$

To obtain correct results in an infinite homogeneous medium ($2a=\infty$) is is essential that:

$$G(2a)=1$$

but $$g(2a)=1$$
$$g(2a+2b)=1$$

and $$-g(2b-2a)=1$$

(See discussion below for $a>b$) Equation 8 becomes:

$$1=\theta_0[1]-\theta_1[1+1]$$
$$\theta_0=1+2\theta_1 \qquad (11)$$

Substituting Equation 11 in Equation 10:

$$1=.833333+(1.666667)\theta_1-(.428571)\theta_1$$
$$.16667=1.238096\theta_1$$

$$\theta_1=\frac{.1667}{1.2381}=.1346\cong.135 \qquad (12)$$

$$\theta_0=1+2\theta_1=1.270 \qquad (13)$$

Since circuit 32 has been shown as a passive, resistive network, obviously it cannot develop signals of greater amplitude than that of the applied signal, however it is the ratios of the weights that is of significance in combining signals in circuit 32. Of course, the correct set of weights can be achieved by appropriate amplification of the signal at leads 33 or by appropriately calibrating the log obtained from recorder 34. It is to be understood, therefore, that wherever weighting factors or weights are referred to herein, although it may not be so stated, a given set should be multiplied by the appropriate apparatus constant K.

Figure 2:
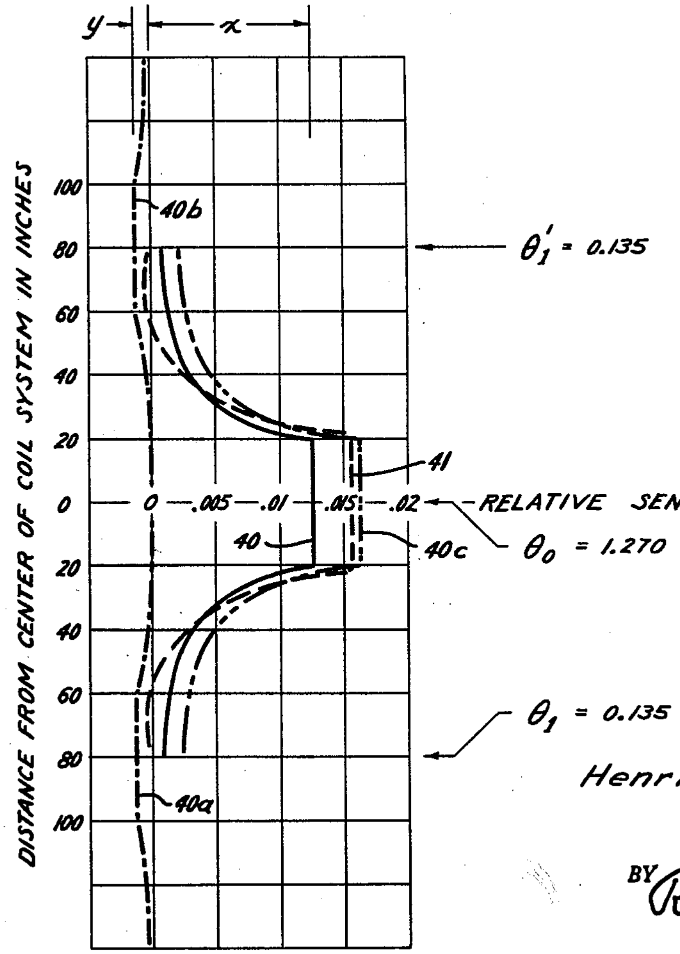

In FIG. 2, the weights $\theta_0, \theta_1$ and $\theta_1'$ are shown in their appropriate space positions at zero, plus eighty inches and minus eighty inches. Curve 41 represents the vertical investigation characteristics of the apparatus of FIG. 1 utilizing these weights.

The following discussion illustrates a method of obtaining a graph of the integrated vertical geometrical factor for various bed thicknesses, using a given set of weights. In this case the weights were determined in Equations 12 and 13. Substituting these weights in Equation 8, along with the assumed base of computation $2b=4L$.

$$G(2a)=1.27[g(2a)]-.135[g(2a+4L)-g(4L-2a)] \qquad (14)$$

Using Equation 14 and the data of Table I, G($2a$) can be calculated for various values of bed thickness $2a$. Such a calculation is illustrated in Table II, and curve 43 in FIG. 3 is a plot of the resulting integrated vertical geometrical factor G($2a$) versus bed thickness expressed in inches

*Table I.—Two-coil system without signal storage and computation* coil spacing = $L$

| Bed Thickness ($2a$) | Integrated Vertical Geometrical Factor $g(2a)$ |
|---|---|
| 0 | 0 |
| .25L | 0.125 |
| .5L | 0.25 |
| .75L | 0.375 |
| L | 0.500 |
| 1.25L | 0.600 |
| 1.5L | 0.666667 |
| 1.75L | 0.714286 |
| 2L | 0.7500 |
| 2.25L | 0.777778 |
| 2.5L | 0.800 |
| 2.75L | 0.818182 |
| 3L | 0.833333 |
| 3.5L | 0.857143 |
| 4L | 0.8750 |
| 4.5L | 0.888889 |
| 5L | 0.900 |
| 5.5L | 0.909091 |
| 6L | 0.916667 |
| 6.5L | 0.923077 |
| 7L | 0.928571 |
| 7.5L | 0.933333 |
| 8L | 0.9375 |
| 8.5L | 0.941176 |
| 9L | 0.944444 |
| 9.5L | 0.947368 |
| 10L | 0.950000 |

*Table II*

[$G(2a)=1.27[g(2a)]-.135[g(2a+4L)-g(4L-2a)]$
where $L$=coil spacing]

| $2a$ | $g(2a)$ | $1.27\,g(2a)$ | $g'=g(2a+4L)$ | $g''=g(4L-2a)$ | $g'-g''$ | $.135(g'-g'')$ | $G(2a)$ |
|---|---|---|---|---|---|---|---|
| 0 | 0 | 0 | | | 0 | 0 | 0 |
| 0.5L | .250000 | .317500 | .857143 | .818182 | .038961 | .005260 | .312 |
| 1.0L | .500000 | .635000 | .900000 | .833333 | .066667 | .009000 | .626 |
| 1.5L | .666667 | .846667 | .904091 | .800000 | .109091 | .014727 | .832 |
| 2.0L | .750000 | .952500 | .916657 | .750000 | .166657 | .022499 | .930 |
| 2.5L | .800000 | 1.016000 | .923077 | .666667 | .256410 | .034615 | .981 |
| 3.0L | .833333 | 1.058333 | .928571 | .500000 | .428571 | .057857 | 1.000 |
| 3.5L | .857143 | 1.088572 | .933333 | .250000 | .683333 | .092250 | .996 |
| 4.0L | .875000 | 1.111250 | .937500 | 0 | .937500 | .126562 | .985 |
| 5.0L | .900000 | 1.143000 | .944444 | -.500000 | 1.444444 | .195000 | .948 |

Represented in FIG. 6 is a situation which occurs when the bed thickness exceeds the total distance between computing levels. If computing level $m_1'$ is considered along with computing level $m_1$, it becomes obvious that the coil system receives signals from the entire region $c$ and also from the region $d$. This occurs because the coil system "sees" the actual bed when it is positioned at $m_1$, and the image bed when it is positioned at $m_1'$. The sum of these two results is the same as the sum of its response to bed $c$ plus its response to region $d$, when the coil system is located at their centers.

Thus, in Equation 6, $2g_1$ becomes:

$$2g_1=g(c)+g(d)$$

but $$c=2a+2b \text{ (from FIG. 6)}$$

and $$d=2a-2b \text{ (from FIG. 6)}$$

therefore, $$2g_1=g(2a+2b)+g(2a-2b) \quad (15)$$

However, according to Equation 6

$$2g_1=g(2a+2b)-g(2b-2a)$$

Thus, if it is assumed that $$g(2a-2b)=-g(2b-2a)$$

Equation 8 can be used when $a>b$ in addition to those cases where $a<b$. This has been done in the sample computation in Table II (above).

The foregoing discussion of a particular procedure for selecting the relative locations of the stations and determining the weights to be applied to the signals corresponding to these stations has been presented purely by way of illustration and is not to be considered in any way as limiting the scope of the present invention. Other procedures will be apparent to those skilled in the art. For example, the result may be achieved entirely on an empirical basis. Thus, a set of station locations and weights may be arbitrarily assumed and characteristic curves such as illustrated in FIGS. 2 and 3 plotted for the assumed conditions. If the characteristics exhibit undesirable features, the station locations and/or the weights can be suitably altered and another plot made. This may be repeated as many times as necessary to arrive at a desired vertical investigation characteristic. Alternative procedures will be discussed in connection with other embodiments of the invention to be described hereinafter.

With reference again to FIG. 1, since the magnetic record on drum 25 represents the induction log as a function of depth of the coil system 13, 14, the relative positions of the pickup heads 26, 27 and 28 about the periphery of drum 25 may be set to produce a required distribution of station locations. Continuously adjustable pickup heads will, of course, provide a wide selection of locations. Moreover, by suitably choosing the resistance values of resistors **32*a*–32*d* of circuit 32** (FIG. 1*a*), appropriate weighting factors may be selected. If desired, certain of the resistors **32*a*–32*d* may be of the continuously variable type or variable in steps so as to provide a variety of relative weights. For example, resistors 32*b* and 32*d*** may be variable in synchronism and in opposite directions so as effectively to determine the relative weights of the center station ($\theta_0$) and the shoulder stations ($\theta_1$, $\theta_1'$).

Of course, since data for a plurality of levels in the borehole must be obtained before computing the conductivity for a given depth, the recorder 34 is arranged in a known manner so as to provide an appropriate depth shift. In this way conductivity values can be correctly correlated with depth.

Figure 7:
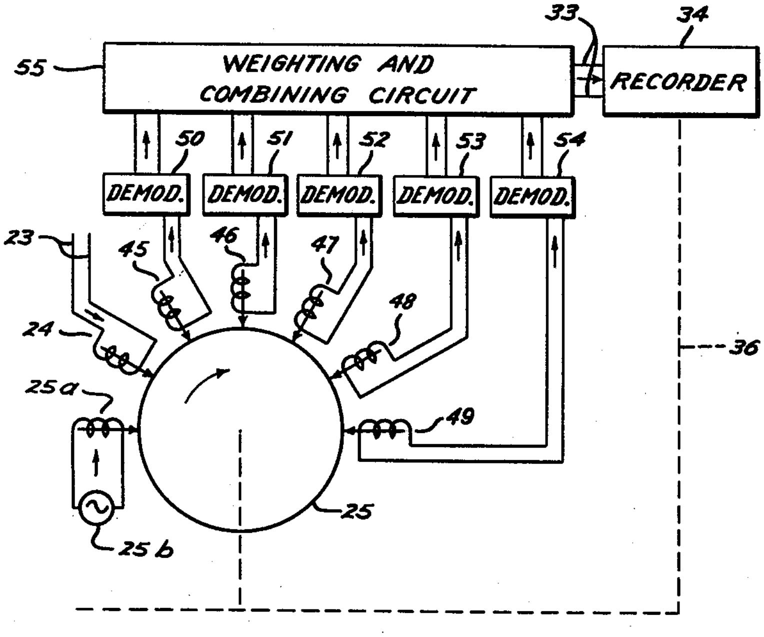
FIG. 7 illustrates a modification which may be made to the apparatus of FIG. 1 according to another embodiment of the invention.

In the practice of the present invention, as many computing stations or locations in the borehole may be utilized as needed to produce a desired result. Thus, while three stations have been illustrated in the embodiment shown in FIG. 1, additional stations may be provided further to increase the vertical resolution of the apparatus and/or to reduce the effects of shoulder beds. For example, the apparatus of FIG. 1 may be modified in the manner represented in FIG. 7 (where corresponding elements are designated by the same reference numerals) to provide five computing levels by means of magnetic pickup heads 45, 46, 47, 48 and 49 operatively associated with magnetic drum 25. The pickup heads feed individual demodulators 50, 51, 52, 53 and 54 which are, in turn, coupled to a weighting and combining circuit 55 which may be like circuit 32 of FIG. 1*a*, but provided with additional resistors similar to resistors **32*a*–32*c*** to handle the additional channels.

In operation, the induction-log-modulated signal at leads 23 is recorded on magnetic drum 25 and the signals corresponding to five individual computing levels are derived by the magnetic pickup heads 45–49. These signals, after demodulation, are applied to weighting and combining circuit 55 which feeds an output signal representing formation conductivity to recorder 34. Thus, a record of conductivity as a function of depth in the borehole is made.

Figure 8:
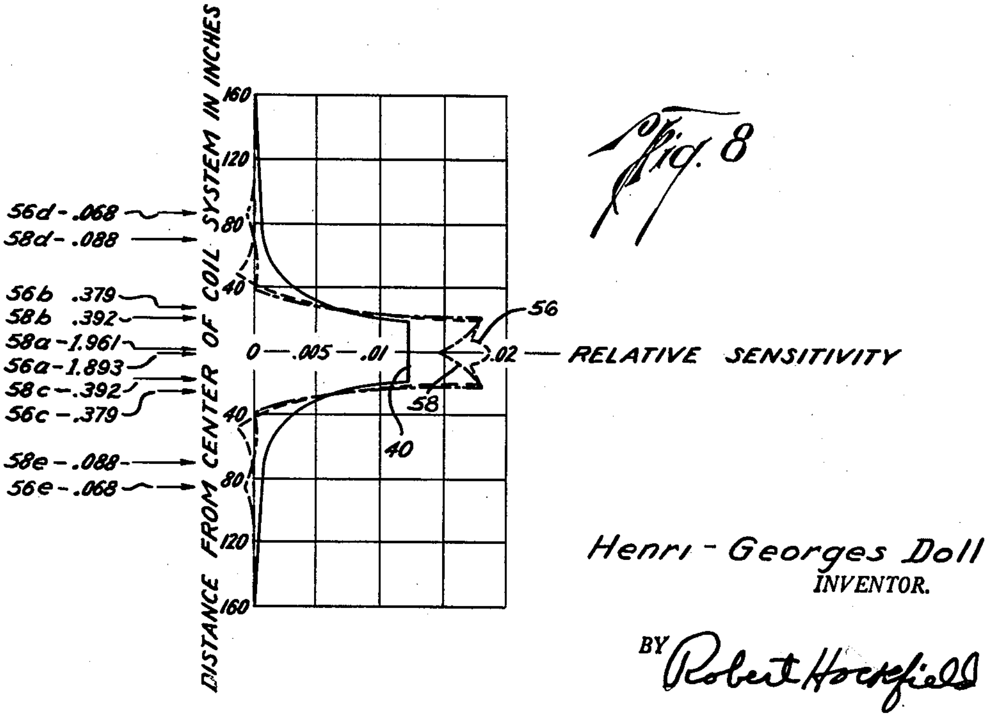
FIGS. 8 and 9 are graphs illustrating typical vertical sensitivity curves for the embodiment of the invention represented in FIG. 7.
Figure 9:
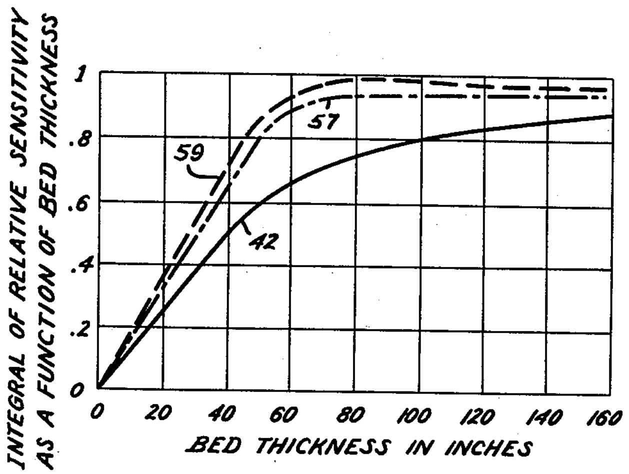

In FIGS. 8 and 9 curves 40 and 42 of FIGS. 2 and 3, respectively, are reproduced for comparative purposes. Utilizing the following station locations and weights the vertical geometrical factor represented by curve 56 in FIG. 8 and the integrated vertical geometrical factor represented by curve 59 are obtained:

$\theta_0$=1.893—arrow **56*a***
$\theta_1=\theta_1'$=.379—arrows **56*b*, 56*c***
$\theta_2=\theta_2'$=.068—arrows **56*d*, 56*e***
$m_1=m_1'$=28 inches from $m_0$
$m_2=m_2'$=84 inches from $m_0$ (The arrows **56*a*–56*e*** are represented on FIG. 8 in their proper space positions.)

It will be noted that curve 56 in FIG. 8 and curve 59 in FIG. 9 clearly show a general improvement over the apparatus that produces the response represented by curves 40, 42.

The vertical geometrical factor represented by curve 58 in FIG. 8 and the integrated vertical geometrical factor illustrated by curve 57 in FIG. 9 were obtained utilizing station locations and weights as follows:

$\theta=1.961$—arrow 58*a*
$\theta_1=\theta_1'=.392$—arrows 58*b*, 58*c*
$\theta_2=\theta_2'=.088$—arrows 58*d*, 58*e*
$m_1=m_1'=20$ inches from $m_0$
$m_2=m_2'=64$ inches from $m_0$ (The arrows 58*a*–58*e* are represented in their relative space positions on FIG. 8.)

The curves 56 and 58 in FIG. 8 and curves 57 and 59 in FIG. 9 illustrate only two of the varied vertical characteristics that are possible by changing the station locations and weights.

The determination of the weighting factors may, of course, be facilitated through the use of a procedure described in connection with FIGS. 4 through 6. Although five instead of three computing stations are used, the method is generally the same and, in general, the determination is based on the premise that the conductivities of beds of at least a particular thickness are to be accurately represented. Since the application of that method to five station computation is well within the capabilities of one skilled in the art, a detailed explanation will not be presented.

Figure 10:
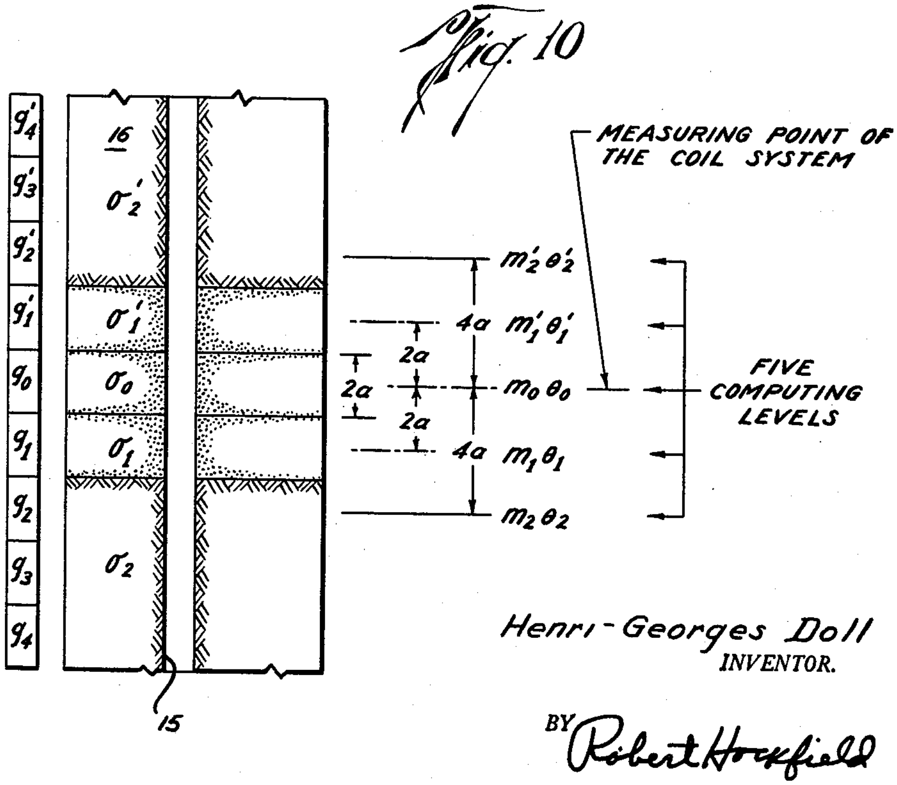
FIG. 10 is a schematic representation of earth formations penetrated by a borehole useful in explaining computations employed in another way of designing apparatus featuring the present invention.

Another method for determining the weighting factors $\theta_0$, $\theta_1$, $\theta_1'$, $\theta_2$ and $\theta_2'$ involves the assumptions that a center bed of thickness $2a$ and conductivity $\sigma_0$ is interposed between adjacent beds, also of thickness $2a$ and of conductivities $\sigma_1$ and $\sigma_1'$, which, in turn, are adjacent to respective beds of semi-infinite thickness and of conductivities $\sigma_2$ and $\sigma_2'$. This set of conditions is represented in FIG. 10. It is also assumed that each of computing stations $m_1$ and $m_1'$ is spaced a distance $2a$ from the center of the principal bed and that each of computing stations $m_2$ and $m_2'$ is spaced a distance $4a$ from the center. Also shown in FIG. 10 is a representation of the space relationships among the various integrated geometrical factors for coil system 13, 14 as follows:

$g_0$=geometrical factor for a bed $2a$ thick with the measuring point of coil system at its center.
$g_1'$=geometrical factor for the $2a$ thick bed with the measuring point of coil system at $m_1$.
$g_1$=geometrical factor for the $2a$ thick bed with the measuring point of coil system at $m_1'$.
$g_2'$=geometrical factor for the $2a$ thick bed with the measuring point of coil system at $m_2$.
$g_2$=geometrical factor for the $2a$ thick bed with the measuring point of coil system at $m_2'$.
$g_3'$=geometrical factor for the $2a$ thick bed with the measuring point of coil system at $6a$ below the center of the main bed.
$g_3$=geometrical factor for the $2a$ thick bed with the measuring point of coil system $6a$ above the center of the main bed.
$g_4'$=geometrical factor for a bed starting at a point $8a$ above the measuring point of the coil system and continuing from there upward to infinity.
$g_4$=geometrical factor for a bed starting at a point $8a$ below the measuring point of the coil system, and continuing from there down to infinity.

The readings $M_0$, $M_1$, $M_1'$, $M_2$ and $M_2'$ obtained at each of the stations $m_0$, $m_1$, $m_1'$, $m_2$ and $m_2'$ prior to computation are as follows:

$$M_0=g_0\sigma_0+g_1\sigma_1+g_1'\sigma_1'+(g_2+g_3+g_4)\sigma_2+(g_2'+g_3'+g_4')\sigma_2' \quad (16)$$

$$M_1=g_1'\sigma_0+g_0\sigma_1+g_2'\sigma_1'+(g_1+g_2+g_3+g_4)\sigma_2+(g_3'+g_4')\sigma_2' \quad (17)$$

$$M_1'=g_1\sigma_0+g_2\sigma_1+g_0\sigma_1'+(g_3+g_4)\sigma_2+(g_1'+g_2'+g_3'+g_4')\sigma_2' \quad (18)$$

$$M_2=g_2'\sigma_0+g_1'\sigma_1+g_3'\sigma_1'+(g_0+g_1+g_2+g_3+g_4)\sigma_2+g_4'\sigma_2' \quad (19)$$

$$M_2'=g_2\sigma_0+g_3\sigma_1+g_1\sigma_1'+g_4\sigma_2+(g_0+g_1'+g_2'+g_3'+g_4')\sigma_2' \quad (20)$$

To produce a true reading opposite a homogeneous bed of infinite thickness $$\theta_0-\theta_1-\theta_1'-\theta_2-\theta_2'=1 \quad (21)$$

Thus, the computed reading $\sigma_a$ should be $$\sigma_a=(1+\theta_1+\theta_1'+\theta_2+\theta_2')M_0-\theta_1M_1-\theta_1'M_1'-\theta_2M_2-\theta_2'M_2' \quad (22)$$

Substituting Equations 16 through 20 in Equation 22, it is seen that $$\begin{aligned}\sigma_a=&\sigma_0[g_0+\theta_1(g_0-g_1')+\theta_1'(g_0-g_1)+\theta_2(g_0-g_2')+\theta_2'(g_0-g_2)]\\&+\sigma_1[g_1+\theta_1(g_1-g_0)+\theta_1'(g_1-g_2)+\theta_2(g_1-g_1')+\theta_2'(g_1-g_3)]\\&+\sigma_1'[g_1'+\theta_1(g_1'-g_2')+\theta_1'(g_1'-g_0)+\theta_2(g_1'-g_3')+\theta_2'(g_1'-g_1)]\\&+\sigma_2[g_2+g_3+g_4-\theta_1g_1+\theta_1'g_2-\theta_2(g_0+g_1)+\theta_2'(g_2+g_3)]\\&+\sigma_2'[g_2'+g_3'+g_4'+\theta_1g_2'-\theta_1'g_1'+\theta_2(g_2'+g_3')-\theta_2'(g_0+g_1')]\end{aligned} \quad (23)$$

Since it is desired to have a true conductivity reading opposite the main bed, the contributions of the adjacent beds should be zero. Accordingly, the quantity inside each of the last four brackets in Equation 23 should be zero. This provides the following four equations including unknowns $\theta_1$, $\theta_1'$, $\theta_2$ and $\theta_2'$ which can be readily solved.

$$(g_1-g_0)\theta_1+(g_1-g_2)\theta_1'+(g_1-g_1')\theta_2+(g_1-g_3)\theta_2'=-g_1 \quad (24)$$

$$(g_1'-g_2')\theta_1+(g_1'-g_0)\theta_1'+(g_1'-g_3')\theta_2+(g_1'-g_1)\theta_2'=-g_1' \quad (25)$$

$$-g_1\theta_1+g_2\theta_1'-(g_0+g_1)\theta_2+(g_2+g_3)\theta_2'=-(g_2+g_3+g_4) \quad (26)$$

$$+g_2'\theta_1-g_1'\theta_1'+(g_2'+g_3')\theta_2-(g_0+g_1')\theta_2'=-(g_2'+g_3'+g_4') \quad (27)$$

This is greatly simplified for the case of a symmetrical coil system, where $g_1=g_1'$, $g_2=g_2'$, $g_3=g_3'$, $g_4=g_4'$, $\theta_1=\theta_1'$ and $\theta_2=\theta_2'$, as follows:

$$(2g_1-g_0-g_2)\theta_1+(g_1-g_3)\theta_2=-g_1 \quad (28)$$

$$(g_2-g_1)\theta_1+(g_2+g_3-g_0-g_1)\theta_2=-(g_2+g_3+g_4) \quad (29)$$

Referring again to Equation 23, once $\theta_1$, $\theta_1'$, $\theta_2$ and $\theta_2'$ are known, the new geometrical factor of the center or main bed is:

$$G_0=g_0+\theta_1(g_0-g_1')+\theta_1'(g_0-g_1)+\theta_2(g_0-g_2')+\theta_2'(g_0-g_2) \quad (30)$$

and if $g(r, z)$ is the geometrical factor for a loop of ground radius $r$ at a height $z$ above the measuring point, the geometrical factor of the same loop after computation is $$G_0(r,z)=(1+\theta_1+\theta_1'+\theta_2+\theta_2')g(r,z)-\theta_1g(r,z-h)-\theta_1'g(r,z+h)-\theta_2g(r,z-2h)-\theta_2'g(r,z+2h) \quad (31)$$

where $h$ is the distance between computing stations. Using the data for the geometrical factor $g(r, z)$ contained in Table I and the derived values of the weights, an arithmetical operation yields $G_0(r, z)$.

Practical application of the foregoing procedure will be obvious to those skilled in the art. Furthermore, this procedure is presented purely as another illustraation to assist in the understanding of the present invention and in no way is intended to limit its scope.

Figure 11:
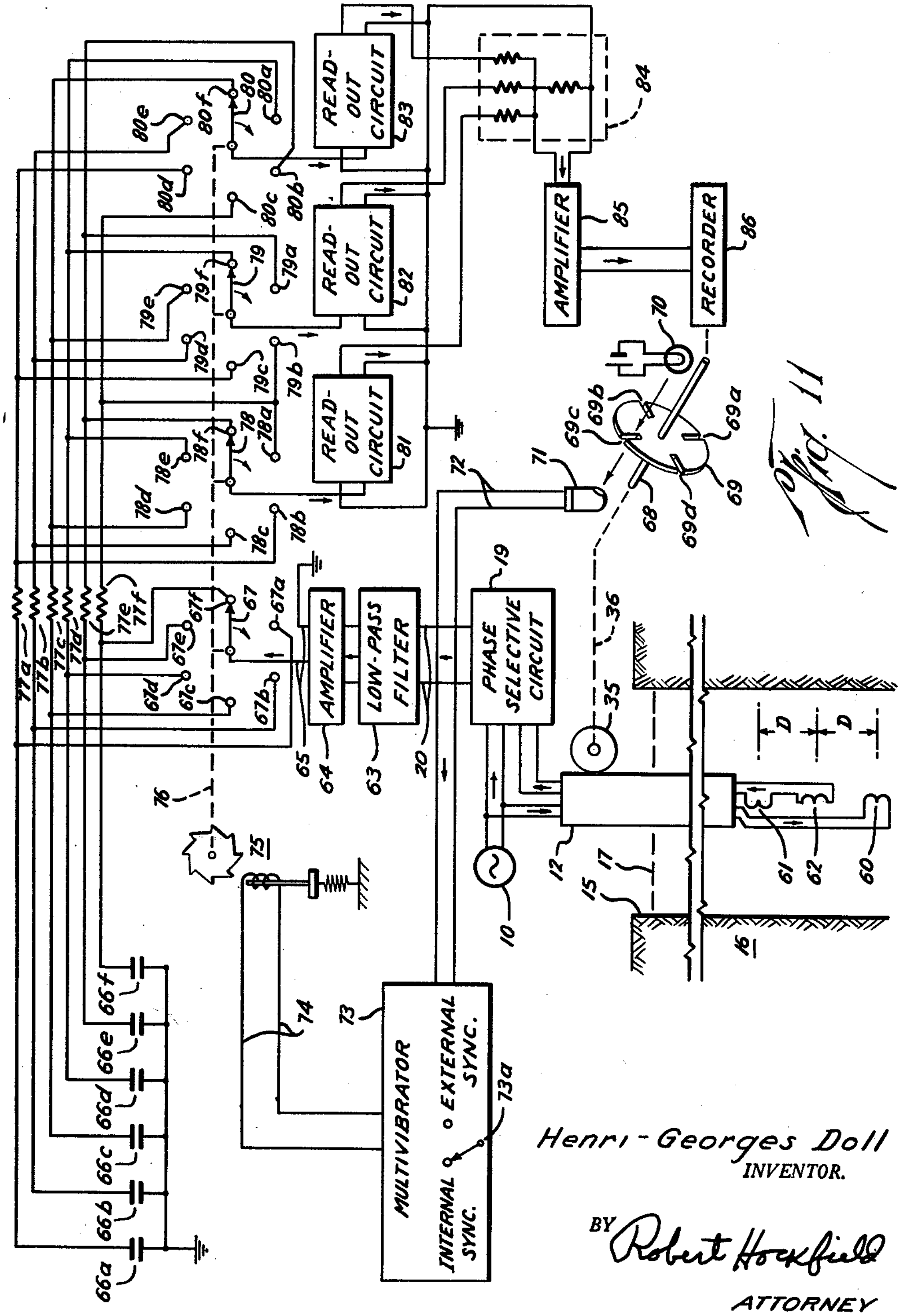
FIG. 11 is a schematic diagram of apparatus constructed in accordance with still another embodiment of the present invention.

In the embodiment of the invention shown in FIG. 11, a system of three coils is employed. Thus, a transmitter coil 60 is energized by source 10 and a main receiver coil 61 is connected in series circuit relation with an auxiliary receiver coil 62, the receiver coils being connected to the input circuit of phase selective circuit 19.

The coil system 60–62 may be constructed in accordance with the teachings of Doll Patent No. 2,582,314 so as to provide a desired lateral or radial focusing characteristic. For instance, coils 60 and 61 may each have 48 turns and may be spaced apart sixty inches while coil 62 has six turns, is positioned between and equidistantly from coils 60 and 61, and is phased in opposite polarity sense relative to coil 61. With this configuration, the conductivity signal derived at leads 20 accurately depicts formations 16 while contributions to that signal caused by the conductivity of drilling mud 17 are minimized if not entirely eliminated as discussed in the aforementioned Patent No. 2,582,314. Furthermore, zero mutual impedance is provided between transmitter coil 60 and the combination of receiver coils 61 and 62.

Instead of a magnetic memory system as featured in the apparatus illustrated in FIG. 1, the apparatus of FIG. 11 is provided with a capacitor-type storage system. Thus, the signal at leads 20 is fed to a low-pass filter 63 designed to exclude high frequency components which might not be effectively translated as a consequence of the sequential switching of capacitors to be described later. Filter 63 is connected to an amplifier 64 which provides a replica of its input signal at an output circuit 65.

To supply the signal from circuit 65 sequentially to a plurality of storage capacitors *66a–66f* in response to movement of coil system 60–62 through the borehole 15, the apparatus includes switch means in the form of a rotatable switch comprised of a movable contact arm 67 adapted to travel along and to engage successively a plurality of fixed contacts *67a–67f* connected to respective ones of the storage capacitors *66a–66f*.

Arm 67 is displaced in synchronism with travel of coil system 60–62 by means of measuring wheel 35 and linkage 36 in association with an electro-mechanical driving system. The driving system includes a disc 69 mounted for rotation with a shaft 68 that is rotated by wheel 35 through linkage 36. Cut into the disc are a plurality of slots *69a–69d* so that as the disc rotates, light from a source 70 is modulated into pulses before impinging on a photoelectric device 71 which may, for example, be a phototransistor. Thus, pulses are developed at output terminals 72 of the phototransistor having a time distribution that is synchronous with movement of coil system 60–62 through borehole 15. Terminals 72 are connected to the input circuit of a multivibrator 73 provided with a conventional switch *73a* so as to be internally or externally synchronized at the option of an operator. In the external synchronization position of switch *73a*, the pulses at terminals 72 control the operation of the multivibrator which, in turn, supplies corresponding pulses over leads 74 to an electromagnetic actuator 75 connected by a linkage, schematically represented by broken-line 76, to switch arm 67.

In order to establish a plurality of independent coupling circuits with successive ones of the storage capacitors *66a–66f*, the capacitors are connected by individual isolating resistors *77a–77f* to fixed contacts of a plurality of switches having rotatable contact arms 78, 79 and 80. In the arrangement illustrated in FIG. 11, movable contacts 67, 78, 79 and 80 are included in respective decks of a conventional rotary stepping switch. These decks are parallel to one another and a common shaft corresponding to linkage 76 connects the actuator 75 to all of the movable arms. The movable arms are longitudinally aligned and thus in order to derive a plurality of signals corresponding to different stations in the borehole 15, the capacitors *66a–66f* are connected through their isolating resistors *77a–77f* to appropriate fixed contacts of the switches including arms 78, 79 and 80. For example, capacitor *66a* is connected by resistor *77a* to the fixed contact *78b* of the switch containing movable arm 78, to fixed contact *79c* of the switch containing movable arm 79 and to fixed contact *80d* of the switch containing movable arm 80. The remaining connections are arranged in a similar manner. Of course, if desired, the fixed contacts may be connected symmetrically, and the arms 78, 79 and 80 may be displaced relative to one another and to arm 67 to provide the required station selection.

The coupling circuits established by switch arms 78, 79 and 80 are connected to individual readout circuits 81, 82 and 83 having relatively high input impedances so as to minimize discharge of the storage capacitors *66a–66f*. For example, they may be cathode followers. As shown, the input connections to readout circuits 81 and 83 are alike but of opposite polarity to that of readout circuit 82 so as to provide a desired signal combination. The readout circuits 81–83 are connected to a combining circuit 84 which may be comprised of a resistor network similar to the one illustrated in FIG. 1*a*. Combining circuit 84 is coupled to an amplifier 85, in turn, coupled to a conventional recorder 86 in which the recording medium is driven by means of shaft 68 so that a continuous log of the processed signal as a function of depth in the borehole 15 is obtained.

Referring once again to the switches including the movable arms 67, 78, 79 and 80, obviously it is possible to employ an arrangement in which these arms are fixed and distributed about the periphery of a drum which carries the contacts *67a–67f*, *78a–78f*, *79a–79f* and *80a–80f*. Of course, suitable slip rings are provided for connections to the several contacts.

In the switch mechanism shown in FIG. 11, if desired an additional arm may be arranged to move just ahead of the movable arm 67 so as to discharge each of the storage condensers *66a–66f* prior to the application of a charge from output circuit 65. Alternatively, as disclosed in copending application Serial No. 807,213 of William J. Sloughter, filed April 17, 1959, and assigned to the same assignee as the present application, amplifier 64 may be constructed in a manner providing a relatively low impedance at output circuit 65 and it is assumed in the discussion to follow that this construction is employed. Moreover, all of the various circuit components illustrated in FIG. 11 may be constructed in accordance with the disclosure in the copending Sloughter application.

Neglecting for a moment the characteristics of coil system 60–62 and the selection of computing station locations and weighting factors, the operation of the apparatus shown in FIG. 11 is as follows. As the coil system is displaced through borehole 15, for example, in an upwardly direction, measuring wheel 35 causes disc 69 to interrupt the light incident on photoelectric device 71 and the resulting pulses control multivibrator 73. The multivibrator pulses operate stepping switch actuator 75 and switch arm 67 is stepped from one of the fixed contacts *67a–67f* to another. Consequently, the signal at leads 20, after attenuation of high frequency components and amplification, is supplied sequentially to the storage capacitors *66a–66f*. Since it is assumed that amplifier 64 has a relatively low output impedance, each condenser is quickly brought to the proper charge potential. In other words, if a condenser is initially uncharged, because of the low impedance charging circuit, it is very quickly charged to the magnitude of the potential at leads 65. On the other hand, if a condenser has a higher charge value as a consequence of a preceding charge condition, the low impedance source causes that condenser to discharge quickly to the proper charge value. It is therefore apparent that the condensers have impressed thereon individual charge potentials representing the conductivity-representative signal that is derived at leads 20 for successive, longitudinally spaced locations along the borehole 15.

It is assumed that a sufficient number of fixed contacts *67a–67f* and corresponding storage capacitors are employed so that at normal logging speeds, the information signal does not change appreciably in amplitude between contacts. For example, one step, or contact, per 5 inches of borehole depth has been used successfully. Moreover, rapid changes in signal level caused by sharp conductivity contrasts or extraneous transients are eliminated by filter 63. Of course, if a higher degree of definition is desired, the number of contacts and corresponding storage capacitors may be increased.

Simultaneously with movement of movable arm 67, movable arms 78, 79 and 80 effectively scan the capacitors 66a–66f in such manner as to develop three signals representing three, longitudinally spaced stations in the borehole 15. These signals or levels are supplied to readout circuits 81, 82 and 83. If the signal at circuit 82 is assumed to be positive, by virtue of the input connections that are used, the signals supplied to the circuits 81 and 83 are of negative polarity. Selected fractions of these signals are arithmetically added or combined in circuit 84 and the resulting processed signal is supplied to amplifier 85 whose output signal is recorded in recorder 86 as a function of depth in the borehole.

Prior to the start of operations, switch 73a may be positioned so that stepping switch actuator 75 receives a continuous sequence of internally generated pulses for displacing switch arm 67 through one entire cycle thereby to bring the condensers 66a–66f to reference charge values. Of course, this type of operation may be used for test purposes.

Although only three computing stations are afforded by the apparatus illustrated in FIG. 11, obviously, by adding decks to the stepping switches, any desired number of stations may be provided.

While any of the various earlier-described procedures may be used for determining the station locations and weighting factors, another method will now be illustrated which makes use of a characteristic of coil system 60–62 referred to as the vertical geometrical factor. Such a characteristic for a coil system in which 2D equals sixty inches is represented by curve 87 in FIG. 12 which is a plot of relative sensitivity as a function of distance from the center of the coil system. It will be noted that in contrast to a similar characteristic for a two-coil system having vertical symmetry, curve 87 illustrates an application of the present invention to a coil system exhibiting a nonsymmetrical vertical investigation characteristic.

It will be assumed that the apparatus after computation is employed shall be capable of accurately indicating the conductivity of a bed ten feet thick. Accordingly, it will be necessary for the vertical investigation characteristic that is ultimately obtained to have zero sensitivity at plus sixty inches and minus sixty inches and because of the characteristics of curve 87 in the region below the center line, i.e., it exhibits a flat portion in the range from zero approximately to plus thirty inches, it is assumed that a station $m_1$ shall be located thirty-five inches below $m_0$ and it will be assumed that a station $m_1'$ shall be located thirty-five inches below $m_0$.

Figure 12:
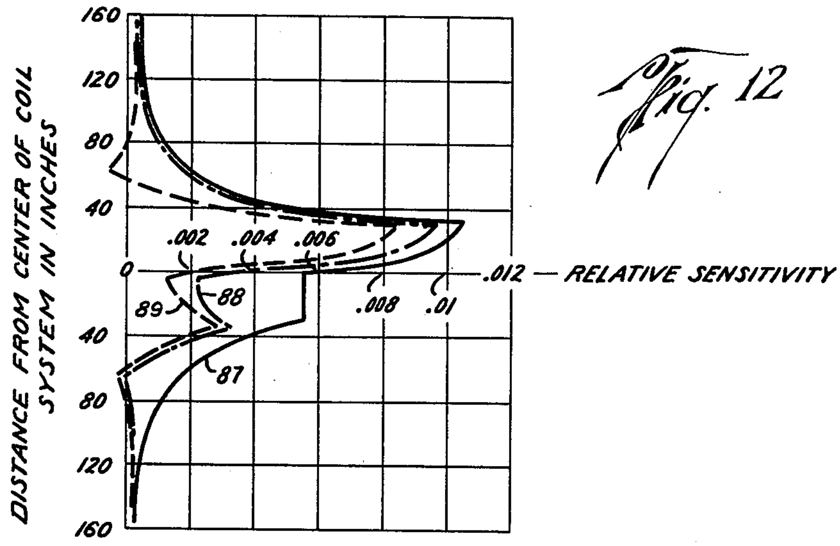
FIGS. 12, 13, 14 and 15 are graphs on which are plotted typical vertical sensitivity curves for the apparatus illustrated in FIG. 11.

If $g(z)$ is the vertical geometrical factor represented by curve 87 in FIG. 12, if $g_1, g_2 \ldots g_n$ are the successive approximations of the vertical geometrical factors after computation, if $z$ is the distance from the center of the coil system 60–62, and if $z_1^0$ and $z_2^0$ are of the locations at which $g_{n(z)}=0$, $$g(z_1^0)-w_1 g(z_1^0-35)=0 \qquad (32)$$

$w_1$ is the appropriate weighting coefficient. From curve 87 in FIG. 12, $g(z_1^0)=.00220$ and $g(z_1^0-35'')=.00555$ and solving for $w_1$, it will be seen that $w_1=.396$. However, since the application of the weight $w_1'$ (to be determined later) will tend to depress the entire resultant curve and thereby violate the condition that the relative sensitivity should be zero at plus sixty inches, a value of .32 is assumed for $w_1$. With this weighting factor alone applied at plus thirty five inches, the resulting relative sensitivity curve is illustrated by curve 88 in FIG. 12. To satisfy the condition that the relative sensitivity be zero at minus sixty inches, it is necessary that $$g_1(z_2^0)-w_1' g_1(z_2^0+35)=0 \qquad (33)$$

From curve 88 it is seen that $g_1(z_2^0)=.0022$ and $g_1(z_2^0+35'')=.0096$ and solving for $w_1'$, it is found to have a value of $-.23$. The resulting relative sensitivity is illustrated by curve 89 of FIG. 12. In order to obtain a correct reading in an infinite, homogeneous bed, the sum of the weights should be equal to one. The final weights are proportional to the $w$'s so determined but for normalization it is required that $$\theta_0+\theta_1+\theta_1'=1=k(w_0+w_1+w_1') \qquad (34)$$

Figure 13:
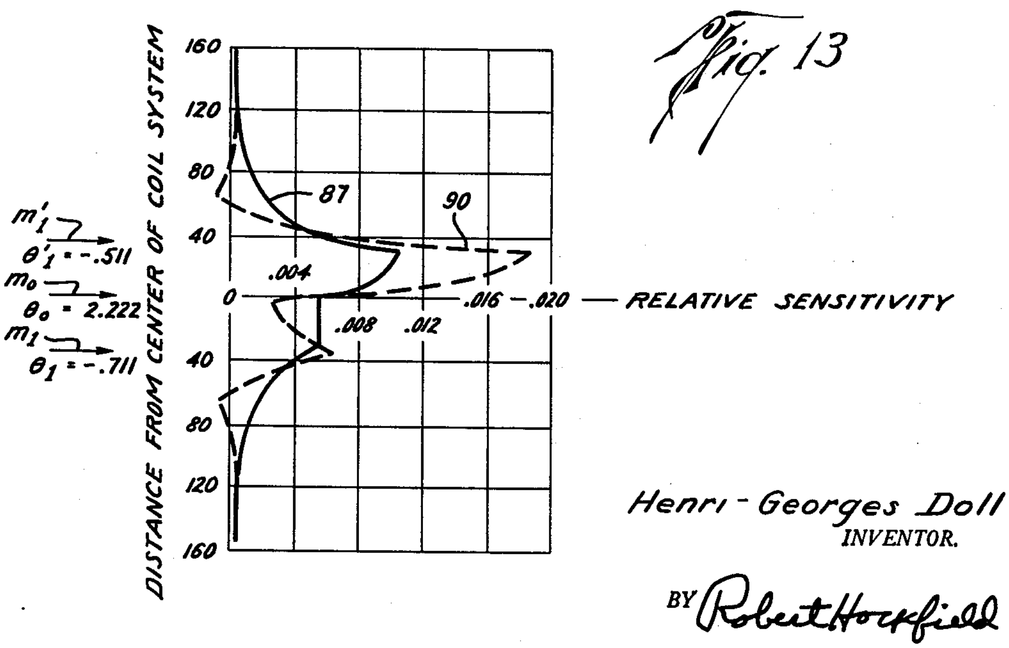

Accordingly, the actual values for the weighting factors are $\theta_0=2.222$, $\theta_1=.711$ and $\theta_1'=.511$. In FIG. 13, the resulting normalized curve 90 is shown together with curve 87 which is repeated for comparative purposes.

Obviously, the steps just described may be repeated again and again to obtain successive sensitivity curves until a curve of desired shape is achieved. For instance, the station locations may be altered in each of a series of approximations and/or the values of the weights successively changed until a desired result follows. On the other hand, additional stations will further reduce the response above and below a bed of selected thickness. Thus, another station may be employed at plus one hundred inches to reduc ethe vertical characteristic in the neighborhood of plus ninety to plus one hundred fifty inches. Further, fifth, or sixth, or any number of additional stations may be provided as deemed appropriate.

Figure 14:
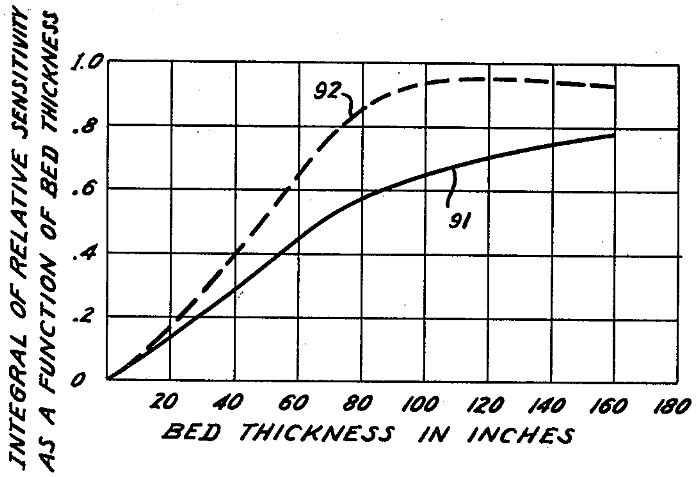
Figure 15:
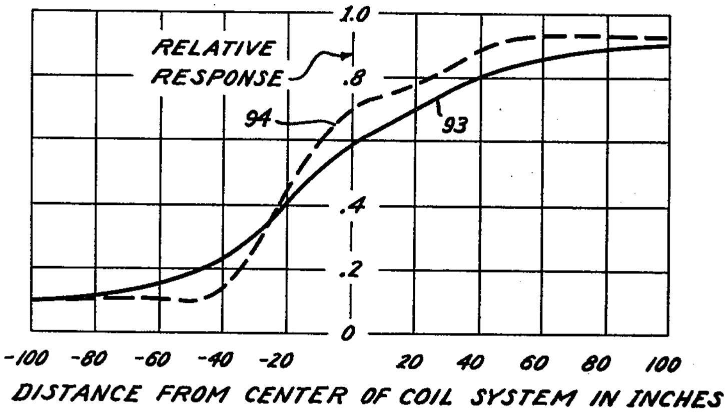

In order to better appreciate the improvement obtained with equipment of FIG. 11, the integrated vertical geometrical factor in finite beds for the portion of the equipment providing a signal at least 20 (FIG. 11) is illustrated by curve 91 in FIG. 14. Utilizing the station locations and weighting factors determined in the above discussion, the equipment providing the signal supplied to the recorder 86 has an integrated vertical geometrical factor represented by curve 92. Obviously, vertical resolution is improved and response to adjacent beds is decreased. In FIG. 15, this feature is again illustrated; curve 93 represents the relative response of a sonde to a semi-infinite bed as a function of distance from bed boundary to the center of the coil system without benefit of the present invention, while curve 94 illustrates the response achieved with equipment embodying the invention.

Figure 16:
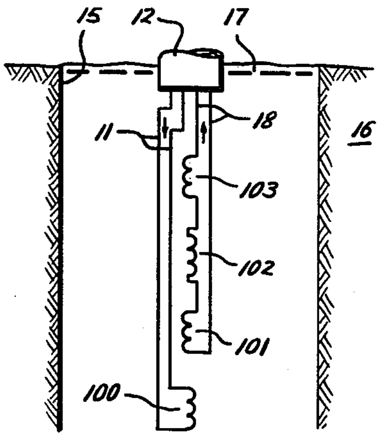
FIG. 16 illustrates a modification which may be made to the apparatus shown in either of FIGS. 1 or 11 in accordance with a further embodiment of the invention.

While the coil system in the apparatus illustrated in FIG. 11 is arranged to provide deep lateral investigation (lateral focussing), apparatus embodying the present invention may conveniently be associated with the coil system exhibiting both lateral and vertical focussing as disclosed in the aforementioned Patent No. 2,582,314. Thus, as shown in FIG. 16, the coil system may comprise a transmitter coil 100 and receiver coils 101, 102 and 103 spaced from the transmitter coil and from one another in the order named. The transmitter coil may have any desired number of turns to afford proper impedance matching and the receiver coils may be arranged as follows:

| Coil | Spacing from Coil 100 in Inches | No. of Turns |
|---|---|---|
| 101 | 44 | −24 |
| 102 | 66 | +100 |
| 103 | 99 | −64 |

Of course, all the specified numbers of turns of the receiver coils may be multiplied by a common factor for proper impedance matching. The coil system of FIG. 16 may be incorporated in apparatus of either of the types illustrated in FIGS. 1 and 11; however, provision is made for eleven computing stations in a manner obvious from the preceding discussions.

With a coil system arranged in the foregoing manner, the response to the borehole liquid 17 is minimized by virtue of lateral focussing, and zero mutual impedance is provided between the transmitter coil and the combination of receiver coils 101–103. Moreover, because of coil 103, a degree of vertical focussing is also afforded as evidenced by the relatively sharp peak in curve 104 in FIG. 17 which is a plot of relative sensitivity as a function of vertical distance for the coil system 100–103. Moreover, in designing coil system 100–103, an effort is made to minimize reductions in lateral penetration. Of course, the depth of penetration may be increased by lengthening the entire coil assembly.

Figure 17:
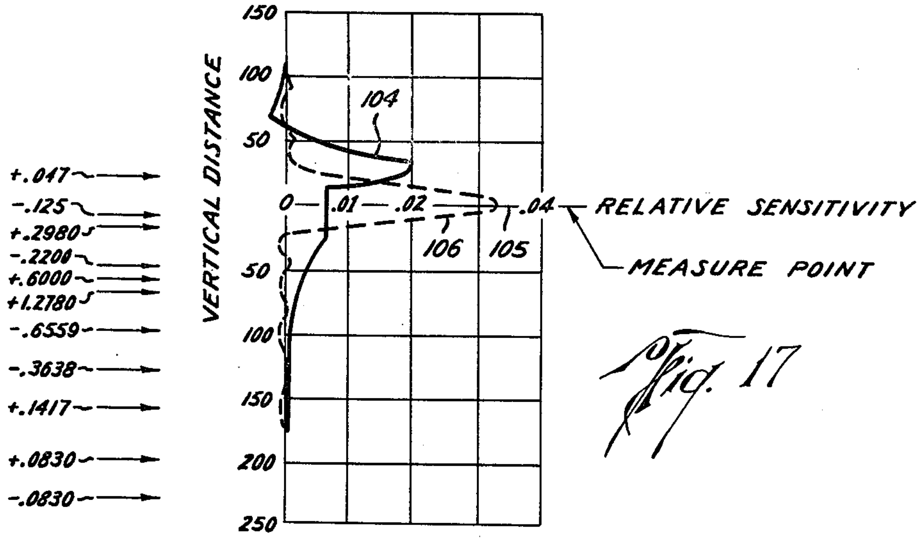
FIGS. 17 and 18 are graphs illustrating typical vertical sensitivity curves for a form of the apparatus embodying the invention of the type shown in FIG. 16.

The measure point for any coil system may be defined as that vertical level which intercepts equal areas of the vertical response curve. Thus, for the coil system of FIG. 16, the measure point, represented by broken line 105 in FIG. 17, is twenty five and one-half inches below the center of transmitter coil 100.

The locations and weights applied to the computing stations may be obtained by any of the various techniques described earlier. One set of data which has been found suitable is tabulated below in Table III in which all distances are referred to the last station which is the one occupied at the time the computed value is printed on the log obtained in recorder 34 (FIG. 1). It will be noted that all computing stations are, in effect, below the transmitter coil 100 and by using a memorizing system covering an interval of two hundred and fifty inches with twenty six memory points spaced 10 inches apart from each other, eleven computing stations may be conveniently provided.

*Table III*

| # of Station | Distance Below Last Station (#11) in Inches | Weighting Factor Applied at Station |
|---|---|---|
| 1 | 250 | −.0830 |
| 2 | 220 | +.0830 |
| 3 | 180 | +.1417 |
| 4 | 150 | −.3638 |
| 5 | 120 | −.6559 |
| 6 | 90 | +1.2780 |
| 7 | 80 | +.6000 |
| 8 | 70 | −.2200 |
| 9 | 40 | +.2980 |
| 10 | 30 | −.1250 |
| 11 | 0 | +.0470 |

Figure 18:
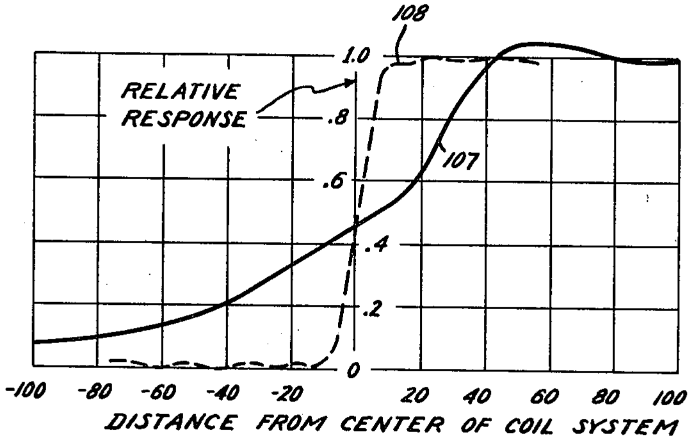

With these weighting factors and station locations, apparatus embodying the present invention exhibits a relative sensitivity characteristic illustrated by curve 106 in FIG. 17. Obviously, desirably sharp vertical resolution is obtained. This is also seen in FIG. 18 where curve 107 illustrates the relative response for the portion of the equipment up to leads 20 and curve 108 represents the relative response of the complete equipment. From curve 108 it may be seen that approximately 90 percent of the vertical geometrical factor exists in a bed 40 inches thick. Moreover, viewing the branches of curve 108 which approach the values of zero and one asymptotically, it can be seen that they depart nowhere by more than one and one-half percent from either value. Accordingly, shoulder effects are minimized.

In general, by employing a nonsymmetrical coil system in apparatus embodying the present invention, excellent overall focussing characteristics are obtained without unduly increasing the length of the coil system. In addition, excellent depth of penetration and reduced effects of conductive shoulders are featured.

Obviously, the coil system and/or station locations and weighting factors may be suitably modified to provide alternative characteristics. For example, in lieu of coil 102, two coils of fifty turns each connected in series and slightly separately from one another can reduce the ripples in curve 106 of FIG. 17. Moreover, if it is desirable to reduce the number of computing stations, this may be done by modifying the coil system. For example, computing stations 10 and 11 (Table III) may be eliminated by reducing the number of turns of receiver coil 103.

Figure 19:
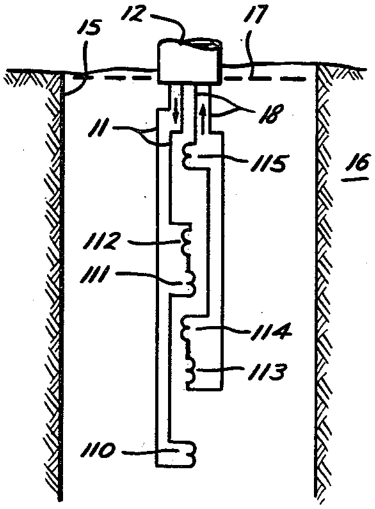
FIG. 19 illustrates another modification which may be made to the apparatus of either FIG. 1 or FIG. 11, in accordance with the invention.

A coil system of the type disclosed in the copending application of Denis R. Tanguy, Serial No. 806,875, filed on April 16, 1959, now Patent No. 3,067,383, and assigned to the same assignee as the present invention, may also be utilized in the practice of the present invention. The Tanguy coil system is illustrated in FIG. 19 where coils 110, 111 and 112 are transmitters and coils 113, 114 and 115 are receivers having the following turns and spacings:

| Coil | Spacing From Coil 110 In Inches | Number of Turns |
|---|---|---|
| 110 | | −4 |
| 111 | 60 | −15 |
| 112 | 70 | +60 |
| 113 | 30 | +60 |
| 114 | 40 | −15 |
| 115 | 100 | −4 |

Figure 20:
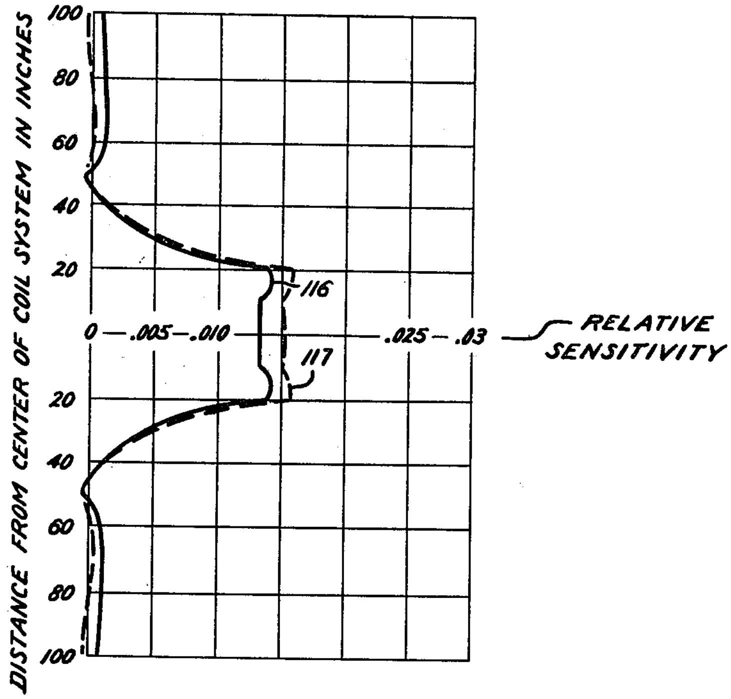
FIGS. 20 and 21 are graphs representing typical vertical sensitivity curves for a particular arrangement of apparatus of the type illustrated in FIG. 19.
Figure 21:
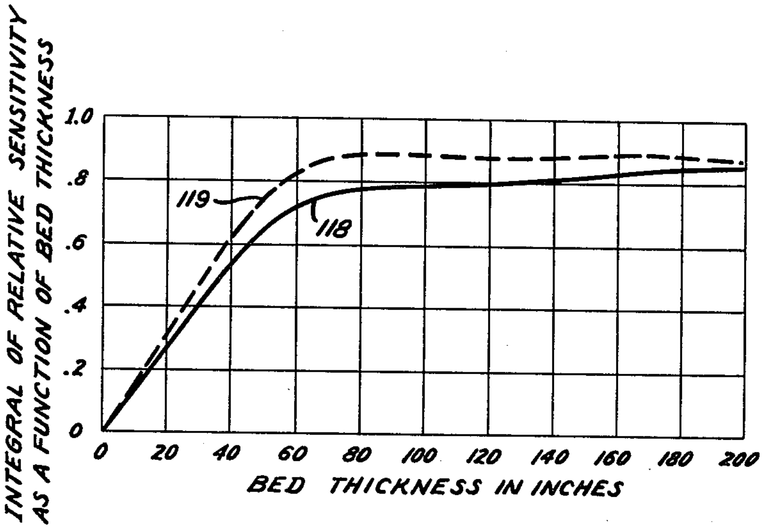

Curve 116 in FIG. 20 illustrates the vertical geometrical factor for coil system 110–115 without computation. Using computing stations at $m_1$ and $m_1'$ spaced eighty inches from $m_0$ and weights $\theta_0=1.32$ and $\theta_1$ and $\theta_1'=.16$, the resulting vertical geometrical factor is as represented by curve 117. In FIG. 21, the integrated geometrical factors before and after computation are shown by curves 118 and 119. From FIGS. 20 and 21, the improvement afforded by the apparatus embodying the present invention is quite obvious.

It should be obvious from the discussions herein that the present invention may be used in association with coil systems of various types. Both symmetrical and asymmetrical systems may be employed and any desired number of computing stations can be utilized. For example, an induction logging system employing a single coil of the type illustrated by the patent to Broding, No. 2,535,666, may be conveniently associated with apparatus embodying the present invention. Either the conductivity signal or the susceptibility signal derived by that system may be processed. Alternatively, and by way of example, any of the various induction logging systems disclosed in the aforementioned Doll Patent No. 2,582,314 or Doll Patent No. 2,852,315, or Poupon Patent No. 2,790,138 may be utilized.

With regard to the distribution of computing stations in FIG. 2, $m_0$ is the station having the largest weighting factor compared to stations $m_1$ and $m_1'$ and may be considered as a reference station. Obviously, stations $m_1$ and $m_1'$, each of which is eighty inches from $m_0$, are distributed symmetrically with respect to the reference station. This is also true of the distributions illustrated in FIG. 8. In FIG. 13, while the stations are symmetrically arranged, the values of the weighting factors are not symmetrical. On the other hand, in the illustration of FIG. 17, the distribution is clearly asymmetrical. In fact, it is possible to position all stations on the same side of the effective measure point denoted by line 105. Accordingly, it is within the contemplation of the present invention to use either symmetrical or asymmetrical distributions of computing stations.

Weighting factors may be determined by using a procedure which, in effect, shifts the geometrical factor curve by an amount equal to the displacement between stations. The resulting geometrical factor may, for example, have a configuration corresponding to a portion of the original geometrical factor curve that is to be minimized. Accordingly, two weights are established which provide a geometrical factor curve that is nearly equal in shape and amplitude to the aforesaid portion, but of opposite polarity.

If desired, multiple coil systems may be utilized simultaneously. For example, additional coils may be provided in any of the apparatus illustrated in FIGS. 1, 11, 16 or 19 so as to provide another, different main coil spacing. The additional coil system may be energized at another frequency or in time-sequence with the existing coil system so that two induction log signals may be derived. Of course, either or both of the signals may be processed in accordance with the present invention to provide individual records. Alternatively, a composite record including a combination of a processed signal for one coil system and an unprocessed signal from another coil system may be obtained to provide additional information concerning the earth formations under investigation. Of course, in addition to information obtained with apparatus embodying the present invention, simultaneous measurements utilizing electrodes for recording spontaneous potential and/or earth formation resistivity may be conveniently employed, as may apparatus for detecting natural or induced radioactivity or apparatus for measuring an acoustic property of the earth formations, such as acoustic velocity.

Another method for applying the present invention is to record the signal at leads 20 (FIG. 1) on a continuous magnetic tape or the like in either analogue or digital form. Subsequently, the signal is read into a computing mechanism involving an appropriate memory and computing circuit. Any of various commercial computers may be utilized with a suitable program to carry out the steps discussed above in connection with any of the embodiments of the invention. In this way many stations can be employed without unduly complicating the apparatus sent to the well for obtaining a log.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

I claim:

1. A method of electromagnetically investigating earth formations traversed by a borehole which comprises the steps of: successively positioning a unitary electromagnetic exploring means having a given, fixed geometrical characteristic at each of a plurality of different depths in a borehole to derive a corresponding plurality of electrical signals individually representative of electrical properties of the adjacent earth formations as sensed by said unitary exploring means when at a corresponding one of the aforesaid depths; combining said plurality of electrical signals individually obtained at different depths in the borehole in a prescribed manner to provide an electrical output signal; and obtaining indications in response to said output signal.

2. A method of electromagnetically investigating earth formations traversed by a borehole which comprises the steps of: successively positioning a unitary electromagnetic exploring means having a given, fixed geometrical characteristic at each of a plurality of different locations in a borehole to derive a corresponding plurality of electrical signals having amplitudes representative of electrical properties of the adjacent earth formations as sensed by said unitary exploring means when at each of the aforesaid locations; simultaneously deriving an additional plurality of electrical signals each having an amplitude equal in value to the amplitude value of a corresponding one of said electrical signals multiplied by a selected proportionality constant, at least two of these proportionality constants having different values; combining said additional plurality of electrical signals in a prescribed manner to provide an electrical output signal; and obtaining indications in response to said output signal.

3. A method of electromagnetically investigating earth formations traversed by a borehole which comprises the steps of: successively positioning a unitary electromagnetic exploring means having a given, fixed geometrical characteristic at each of a plurality of different locations in a borehole to derive a corresponding plurality of electrical signals having amplitude values representative of electrical properties of the adjacent earth formations as sensed by said unitary exploring means when at each of the aforesaid locations; simultaneously deriving an additional plurality of electrical signals each having an amplitude value equal to the amplitude value of a particular one of said electrical signals multiplied by a selected proportionality constant, the sum of all such proportionality constants being equal to unity; combining said additional plurality of signals in a prescribed manner to provide an electrical output signal; and obtaining indications in response to said output signal.

4. A method of electromagnetically investigating earth formations traversed by a borehole which comprises the steps of: successively positioning a unitary electromagnetic exploring means having a given, fixed geometrical characteristic at each of a plurality of different locations in a borehole to derive a corresponding plurality of electrical signals having amplitude values representative of electrical properties of the adjacent earth formations as sensed by said unitary exploring means when at each of the aforesaid locations; simultaneously deriving an additional plurality of signals each having an amplitude value equal to the amplitude value of a particular one of said electrical signals multiplied by a selected proportionality constant, at least one of said additional signals being of positive polarity and at least one of said additional signals being of negative polarity; combining said additional plurality of electrical signals to provide an electrical output signal representing the algebraic sum of the amplitudes thereof; and obtaining indications in response to said output signal.

5. A method of electromagnetically investigating earth formations traversed by a borehole which comprises the steps of: continuously moving electromagnetic exploring means having a given, fixed geometrical characteristic through a borehole to derive an electrical information signal representing an electrical property of the adjacent earth formations as a function of the position of said exploring means in the borehole; reproducibly storing the information contained in at least a portion of said electrical signal to provide a reproducible record representative thereof; simultaneously reproducing portions of said record corresponding to locations of said exploring means in the borehole of selected relative, vertical spacing thereby to derive a plurality of reproduced signals; electrically combing said plurality of reproduced signals in a prescribed manner to provide an output signal; and obtaining indications in response to said output signal.

6. A method of electromagnetically investigating earth formations traversed by a borehole which comprises the steps of: continuously moving electromagnetic exploring means having a given, fixed geometrical characteristic through a borehole to derive an electrical information signal representing an electrical property of the adjacent earth formations as a function of the position of said exploring means in the borehole; reproducibly storing the information contained in at least portions of said electrical signal to provide a reproducible record representative thereof; simultaneously reproducing portions of said record corresponding to locations of said exploring means in the borehole of selected relative, vertical spacings distributed symmetrically relative to a reference location thereby to derive a plurality of reproduced signals; electrically combining said plurality of reproduced signals in a prescribed manner to provide an output signal, and obtaining indications in response to said output signal.

7. A method of electromagnetically investigating earth formations traversed by a borehole which comprises the steps of: continuously moving electromagnetic exploring means having a given, fixed geometrical characteristic through a borehole to derive an electrical information signal representing an electrical property of the adjacent earth formations as a function of the position of said exploring means in the borehole; reproducibly storing the information contained in at least portions of said electrical signal to provide a reproducible record representative thereof; simultaneously reproducing portions of said record corresponding to locations of said exploring means in the borehole of selected relative, vertical spacings distributed asymmetrically relative to a reference location thereby to derive a plurality of reproduced signals; electrically combining said plurality of reproduced signals in a prescribed manner to provide an output signal; and obtaining indications in response to said output signal.

8. A method of electromagnetically investigating earth formations traversed by a borehole which comprises the steps of: continuously moving electromagnetic exploring means having a given, fixed geometrical characteristic through a borehole to derive an electrical information signal having an amplitude representing an electrical property of the adjacent earth formations as a function of the position of said exploring means in the borehole; reproducibly storing the information contained in at least portions of said electrical signal to provide a reproducible record representative thereof; simultaneously reproducing portions of said record corresponding to locations of said exploring means in the borehole of selected relative, vertical spacing thereby to derive a plurality of reproduced signals; deriving an additional plurality of electrical signals each having an amplitude proportional to the amplitude of one of said reproduced signals; electrically combining said additional plurality of electrical signals to derive an output signal having an amplitude equal to the sum of the amplitudes of said additional plurality of signals; and obtaining indications in response to said output signal.

9. A method of electromagnetically investigating earth formations traversed by a borehole which comprises the steps of: continuously moving electromagnetic exploring means having a given, fixed geometrical characteristic through a borehole to derive an electrical signal having a value dependent upon the electrical conductivity of the adjacent earth formations as a function of the position of said exploring means in the borehole; reproducibly storing the information contained in at least portions of said electrical signal to provide a reproducible record in which successive earth formation conductivity values are represented in physically spaced positions; simultaneously reproducing spaced portions of said record corresponding to locations of said exploring means in the borehole of selected relative, vertical spacing thereby to derive a plurality of reproduced signals; electrically combining said plurality of reproduced signals in a prescribed manner to provide an output signal; and obtaining indications in response to said output signal.

10. A method of electromagnetically investigating earth formations traversed by a borehole which comprises the steps of: continuously moving electromagnetic exploring means having a given, fixed geometrical characteristic through a borehole to derive an electrical information signal representing an electrical property of the adjacent earth formations as a function of the position of said exploring means in the borehole; reproducibly storing the information contained in at least a portion of said electrical signal to provide a reproducible record representative thereof; simultaneously reproducing portions of said record corresponding to locations of said exploring means in the borehole of selected relative, vertical spacing thereby to derive a plurality of reproduced signals; deriving an additional plurality of electrical signals each having an amplitude proportional to the amplitude of a particular one of said reproduced signals, at least one of said additional signals being of positive polarity and at least one of said additional signals being of negative polarity; electrically combining said plurality of reproduced signals to provide an output signal representing the arithmetic sum of the amplitudes of said additional signals; and obtaining indications in response to said output signal.

11. A method of electromagnetically investigating earth formations traversed by a borehole which comprises the steps of: continuously moving electromagnetic exploring means having a given, fixed geometrical characteristic through a borehole to derive an electrical information signal representing an electrical property of the adjacent earth formations as a function of the position of said exploring means in the borehole; developing a pattern of capacitive charges representing corresponding portions of said electrical signal to provide a reproducible record; simultaneously contacting portions of said pattern of capacitive charges corresponding to locations of said exploring means in the borehole of selected relative, vertical spacing thereby to derive a plurality of reproduced signals; electrically combining said plurality of reproduced signals in a prescribed manner to provide an output signal; and obtaining indications in response to said output signal.

12. A method of electromagnetically exploring earth formations traversed by a borehole which comprises the steps of: establishing an alternating magnetic field in the borehole at one station to produce alternating electrical current flow in the adjacent earth formations thereby to induce a resultant alternating magnetic field in a first zone located in the borehole in fixed spatial relation to said one station; deriving a first signal in response to said resultant alternating magnetic field in said first zone; establishing an alternating magnetic field in the borehole at another station spaced longitudinally from said one station to produce alternating electrical current flow in the adjacent earth formations thereby to induce a resultant alternating magnetic field in a second zone located in the borehole in the same spatial relation to said other station as said first zone is to said one station; deriving a second signal in response to a said resultant alternating magnetic field in said second zone; and obtaining indications in response to a predetermined combination of selected components of said first and said second signals.

13. A method of electromagnetically exploring earth formations traversed by a borehole which comprises the steps of: establishing an alternating magnetic field in the borehole at a plurality of successive stations to produce alternating electrical current flow in the earth formations adjacent to each station thereby to induce a resultant alternating magnetic field in a zone in the borehole in fixed spatial relation to said each such station; deriving an electrical signal in response to said resultant alternating magnetic field; storing said electrical signal to provide a reproducible record thereof; reproducing said record to derive a plurality of reproduced signals representing portions of said electrical signal corresponding to spaced stations in the borehole; deriving an additional plurality of signals each proportional to one of said reproduced signals; and obtaining indications in response to a predetermined combination of said additional plurality of signals.

14. A method of electromagnetically exploring earth formations traversed by a borehole which comprises the steps of: establishing an alternating magnetic field in the borehole at successive stations to produce alternating electrical current flow in the adjacent earth formations thereby to induce a resultant alternating magnetic field in a zone in the borehole in fixed spatial relation to each such station; deriving an electrical signal in response to said resultant alternating magnetic field, said electrical signal having amplitude values representing an electrical property of the adjacent earth formations as sensed at each of the several stations; producing a reproducible record in response to said electrical signal including a space pattern of information values corresponding to amplitude values of said electrical signal; simultaneously reproducing from spaced portions of said record a plurality of reproduced signals corresponding to selected, spaced stations in the borehole; deriving the sum of the amplitudes of an additional plurality of electrical signals each having an instantaneous amplitude corresponding to the instantaneous amplitude of one of said reproduced signals multiplied by a selected weighting factor, the algebraic sum of all such weighting factors being equal to unity; and obtaining indications in response to said sum.

15. Apparatus for electromagnetically exploring earth formations traversed by a borehole comprising: a coil system adapted to be lowered into a borehole; a source of electrical energy connected to said coil system to energize the same; circuit means coupled to said coil system in a fixed manner for deriving an electrical output signal in response to an electrical characteristic of material adjacent to said coil system; means for disposing said coil system at two longitudinally spaced stations in the borehole at two different moments of time for developing at the output of the signal-deriving circuit means respective first and second output signals each corresponding to a different one of said stations; and means for combining unequal proportions of said first and said second signals to develop a resultant electrical signal providing an improved indication of the desired electrical characteristic.

16. Apparatus for electromagnetically exploring earth formations traversed by a borehole comprising: a coil system having a given, fixed geometrical factor; means for passing said coil system through a borehole; a source of electrical energy connected to said coil system to energize the same; means coupled to said coil system for deriving a signal in response to an electrical characteristic of material adjacent to said coil system; a recording system for producing a reproducible record of said signal as a function of the position of said coil system in the borehole; reproducing means associated with said recording system for simultaneously deriving a plurality of reproduced signals corresponding to spaced stations in the borehole; a computing circuit electrically coupled to said reproducing means for deriving and combining selected proportions of said plurality of reproduced signals to provide an output signal; and indicating means electrically coupled to said computing circuit and responsive to said output signal.

17. Apparatus for electromagnetically exploring earth formations traversed by a borehole comprising: a coil system having a given, fixed geometrical factor; means for passing said coil system through a borehole; a source of electrical energy connected to said coil system to energize the same; means coupled to said coil system for deriving a signal having an instantaneous amplitude representing an electrical characteristic of material adjacent to said coil system; a recording system for producing a reproducible record of the amplitude of said signal as a function of the position of said coil system in the borehole; a plurality of reproducing means associated with said recording system for deriving a plurality of reproduced signals corresponding to spaced stations in the borehole; a resistive network including a plurality of input resistors and an output resistor in series circuit relation with each of said input resistors and having a pair of terminals, said input resistors having selected resistance values; means for coupling each of said reproducing means to one series circuit including an individual one of said input resistors and said output resistor thereby to derive an algebraic combination of selected proportions of said reproduced signals at said terminals of said output resistor; and indicating means coupled to said output terminals.

18. Apparatus for electromagnetically exploring earth formations transversed by a borehole comprising: a coil system adapted to be lowered into a borehole; a source of electrical energy connected to said coil system to energize the same; means coupled to said coil system for deriving a signal having an amplitude dependent upon an electrical characteristic of material adjacent to said coil system; means for passing said coil system through the borehole whereby said signal exhibits amplitude variations in accordance with variations in said electrical characteristic of earth formation material sensed as a function of the position of said coil system in the borehole; a plurality of storage condensers; means for utilizing said signal to apply a changing potential to each of successive ones of said condensers corresponding to one of successive locations of said coil system in the borehole; means for simultaneously sampling the charge potential on a selected plurality of said storage condensers corresponding to a predetermined distribution of locations of said coil system in the borehole to provide a plurality of reproduced signals; means for deriving and combining an additional plurality of signals each having an amplitude dependent upon a predetermined fraction of the amplitude of one of said signals to develop an output signal; and indicating means coupled to said last-mentioned means to provide indications in response to said output signal.

19. Apparatus for electromagnetically exploring earth formations traversed by a borehole comprising: at least two alternating current energized transmitter-receiver coil systems mounted in fixed relation to each other for movement through a borehole and having different sensitivity characteristics corresponding to different zones of investigation; electrical circuit means for combining the response of one of said coil systems with the response of another so as to produce a resultant response representative primarily of material lying in a predetermined zone; means for obtaining an information signal dependent upon said resultant response; means for displacing said coil systems through the borehole whereby said information signal represents an electrical characteristic of earth formation material adjacent to said coil systems as a function of the position thereof in the borehole; a recording system for producing a reproducible record of said information signal; reproducing means associated with said recording system for simultaneously deriving a plurality of reproduced signals corresponding to spaced stations in the borehole; computing means electrically coupled to said reproducing means for deriving an output signal representing a selected combination of said reproduced signals; and indicating means electrically coupled to said reproducing means for providing indications in response to said output signal.

20. Apparatus for electromagnetically exploring earth formations traversed by a borehole comprising: a coil array including a transmitter coil and a plurality of receiver coils mounted on one side of said transmitter coil in fixed, spaced relation to said transmitter coil and to one another, said transmitter coil and each of said receiver coils constituting one of at least two alternating current energized transmitter-receiver coil systems movable through a borehole and having different sensitivity characteristics corresponding to different zones of investigation; electrical circuit means for combining the response of one of said coil systems with the response of another so as to produce a resultant response representative primarily of material lying in a predetermined zone; means for obtaining an information signal dependent upon said resultant response; means for displacing said coil systems through the borehole whereby said information signal represents an electrical characteristic of earth formation material adjacent to said coil systems as a function of the position thereof in the borehole; a recording system for producing a reproducible record of said information signal; reproducing means associated with said recording system for simultaneously deriving a plurality of reproduced signals corresponding to spaced stations in the borehole; computing means electrically coupled to said reproducing means for deriving an output signal representing a selected combination of said reproduced signals; and indicating means electrically coupled to said reproducing means for providing indications in response to said output signal.

21. Apparatus for electromagnetically investigating earth formations traversed by a borehole comprising: a coil system including a transmitter coil and a receiver coil mounted in fixed relation to one another; means coupled to said transmitter coil for supplying alternating current thereto; electrical means coupled to said receiver coil for deriving an electrical signal having an amplitude representative of material lying in a predetermined zone surrounding said coil system; means for disposing said coil system at a plurality of stations in a borehole thereby to provide in said electrical means a corresponding plurality of electrical signals; electrical circuit means for effectively combining selected fractions of the amplitudes of said plurality of electrical signals to produce a resultant signal; and means coupled to said electrical circuit means for obtaining indications in response to said resultant signal.

22. Apparatus for electromagnetically investigating earth formations traversed by a borehole comprising: a coil system including a transmitter coil and a receiver coil mounted in fixed relation to one another; means coupled to said transmitter coil for supplying alternating current thereto; electrical means coupled to said receiver coil for deriving an electrical signal having an amplitude representative of an electrical characteristic of material lying in a predetermined zone surrounding said coil system; means for passing said coil system through a borehole thereby to provide in said electrical means an information signal exhibiting amplitude variations representative of variations in said electrical characteristic of earth formation material as a function of the position of said coil system in the borehole; a recording and reproducing system coupled to said electrical circuit means for establishing a reproducible record of said information signal and for deriving a plurality of reproduced signals corresponding to spaced locations of said coil system in the borehole; electrical circuit means coupled to said recording and reproducing system for effectively combining selected fractions of the amplitudes of said plurality of reproduced signals to produce an output signal; and means coupled to said electrical circuit means for obtaining indications in response to said output signal.

23. A method of electromagnetically investigating earth formations traversed by a borehole comprising: successively positioning a unitary coil system at different depths in the borehole; electromagnetically measuring a formation electrical characteristic with this unitary coil system while at these different depths in the borehole and deriving electrical signals proportional to these measurements and combining these electrical signals, using different proportions of at least two of these signals, to produce a single electrical signal providing an improved indication of the formation characteristic at a single borehole depth.

24. A method of electromagnetically investigating earth formations traversed by a borehole comprising: successively positioning a unitary coil system at different depths in the borehole; electromagnetically measuring a formation electrical characteristic with this unitary coil system while at these different depths in the borehole; producing simultaneously-occurring electrical signals proportional to these different measurements; and combining these electrical signals to produce a single electrical signal providing an improved indication of the formation characteristic at a single borehole depth.

25. A method of electromagnetically investigating earth formations traversed by a borehole comprising: successively positioning a unitary coil system at different depths in the borehole; electromagnetically measuring a formation electrical characteristic with this unitary coil system while at these different depths in the borehole; producing simultaneously-occurring electrical signals proportional to these measurements; and combining these electrical signals in proportions determined by the integrated geometrical factors of predetermined formation regions relative to the various measurement depths to produce a single electrical signal providing an improved indication of the formation characteristic at a single borehole depth.

26. A method of electromagnetically investigating earth formations traversed by a borehole comprising: successively positioning a unitary coil system at different depths in the borehole; electromagnetically measuring a formation electrical characteristic with this unitary coil system while at these different depths in the borehole, an intermediate one of these depths constituting a reference depth: producing simultaneously-occurring electrical signals proportional to these measurements; and combining these electrical signals, using different proportions of the signals corresponding to the measurements obtained at different distances from the reference depth, to produce a single electrical signal providing an improved indication of the formation characteristic at the reference depth.

27. A method of electromagnetically investigating earth formations traversed by a borehole comprising: successively positioning a unitary coil system at different depths in the borehole; electromagnetically measuring a formation electrical characteristic with this unitary coil system while at these different depths in the borehole, an intermediate one of these depths constituting a reference depth; producing simultaneously-occurring electrical signals proportional to these measurements; and subtracting predetermined proportions of the electrical signals for other than the reference depth from a different predetermined proportion of the electrical signal for the reference depth to produce a single electrical signal providing an improved indication of the formation characteristic at the reference depth.

28. A method of electromagnetically investigating earth formations traversed by a borehole comprising: successively positioning a unitary coil system at different depths in the borehole; electromagnetically measuring a formation electrical characteristic with this unitary coil system while at these different depths in the borehole, one of these depths constituting a reference depth; producing simultaneously-occurring electrical signals proportional to these measurements; combining these electrical signals, using different proportions of at least two of the signals, to produce a single resultant electrical signal providing an improved indication of the formation characteristic at the reference depth; repeating the foregoing steps for other reference depths; and recording the various resultant electrical signals as a function of the corresponding reference depths.

29. A method of electromagnetically investigating earth formations traversed by a borehole comprising: moving an energized unitary coil system through the borehole for developing electrical output signals dependent on the electrical conductivity of the earth formations, the output signal developed at any given depth including undesired signal components produced by formation regions located more than a desired distance above and below that given depth; obtaining indications of the output signals developed by the unitary coil system when positioned at a given depth and at depths located above and below such given depth; and subtracting the indications obtained above and below the given depth from the indication obtained at the given depth to provide an improved indication of the formation conductivity at the given depth.

30. A method of electromagnetically investigating earth formations traversed by a borehole comprising: moving an energized unitary coil system through the borehole for developing electrical output signals dependent on the electrical conductivity of the earth formations, the output signal developed at any given depth including undesired signal components produced by formation regions located more than a desired distance above and below that given depth; obtaining indications of the output signals developed by the unitary coil system when positioned at a given depth and at depths located above and below such given depth; attenuating the indications obtained above and below the given depth relative to the indication obtained at the given depth; and subtracting the attenuated indications from the indication obtained at the given depth to provide an improved indication of the formation conductivity at the given depth.

31. Induction logging apparatus for investigating earth formations traversed by a borehole comprising: a coil system adapted for movement through the borehole; means for energizing the coil system with alternating current; means coupled to the coil system for developing electrical signals proportional in magnitude to an electrical characteristic of the formation material at different depths in the borehole; means for translating the electrical signals obtained for different borehole depths including means for applying unequal gain factors to at least two of these signals during such translation; and means for combining the translated signals to develop a resultant electrical signal providing an improved indication of the desired formation characteristic.

32. Induction logging apparatus for investigating earth formations traversed by a borehole comprising: a coil system adapted for movement through the borehole; means for energizing the coil system with alternating current; means coupled to the coil system for developing electrical signals proportional in magnitude to an electrical characteristic of the formation material at different depths in the borehole; a plurality of signal translating means for translating these signals, at least all but one of these translating means including signal delay means for producing at the output terminals of the different translating means simultaneous occurrence of signal portions corresponding to different depths in the borehole; means providing different signal transfer proportionality constants for at least two of these translating means; and means for combining the translated signals to develop resultant electrical signals providing improved indications of the desired formation characteristic.

33. Induction logging apparatus for investigating earth formations traversed by a borehole comprising: a coil system adapted for movement through the borehole; means for energizing the coil system with alternating current; circuit means coupled to the coil system for developing electrical signals proportional in magnitude to an electrical characteristic of the formation material at different depths in the borehole; signal storage means coupled to the circuit means and synchronized with the movement of the coil system through the borehole for producing at different storage means output terminals the simultaneous occurrence of signal portions corresponding to different depths in the borehole; means for combining a plurality of electrical signals; a plurality of signal translating means coupling a plurality of the storage means output terminals to the signal combining means, at least two of these signal translating means including means providing different signal transfer proportionality constants for their respective signals; and means for providing indications of the resultant electrical signals developed by the signal combining means.

34. Induction logging apparatus for investigating earth formations traversed by a borehole comprising: a coil system adapted for movement through the borehole; means for energizing the coil system with alternating current; means coupled to the coil system for developing electrical signals proportional in magnitude to an electrical characteristic of the formation material at different depths in the borehole; a plurality of signal translating means for translating these signals, at least all but one of these translating means including signal delay means for producing at the output terminals of the different translating means simultaneous occurrence of signal portions obtained for selected depths in the borehole relative to one another; and means for combining the translated signals to develop resultant electrical signals providing improved indications of the desired formation characteristic.

35. Induction logging apparatus for investigating earth formations traversed by a borehole comprising: a coil system adapted for movement through the borehole; means for energizing the coil system with alternating current; means coupled to the coil system for developing electrical signals proportional in magnitude to an electrical characteristic of the formation material at different depths in the borehole; a plurality of signal translating means for translating these signals, at least all but one of these translating means including signal delay means for producing at the output terminals of the different translating means simultaneous occurrence of signal portions corresponding to different depths in the borehole; and means for combining the translated signals to develop resultant electrical signals providing improved indications of the desired formation characteristic.

36. Induction logging apparatus for investigating earth formations traversed by a borehole comprising: a coil system adapted for movement through the borehole; means for energizing the coil system with alternating current; means coupled to the coil system for developing electrical signals proportional in magnitude to an electrical characteristic of the formation material at different depths in the borehole; a plurality of signal translating means for translating these signals, at least all but one of these translating means including signal delay means for producing at the output terminals of the different translating means simultaneous occurrence of signal portions obtained for selected depths in the borehole relative to one another; means for applying different gain factors to the signals translated by at least two of these translating means; and means for combining the translated signals to develop resultant electrical signals providing improved indications of the desired formation characteristic.

37. Induction logging apparatus for investigating earth formations traversed by a borehole comprising: a coil system adapted for movement through the borehole; means for energizing the coil system with alternating current; circuit means coupled to the coil system for developing electrical signals proportional in magnitude to an electrical characteristic of the formation material at different depths in the borehole; signal storage means coupled to the circuit means and synchronized with the movement of the coil system through the borehole for producing at different storage means output terminals the simultaneous occurrence of signal portions obtained for selected depths in the borehole relative to one another; means for combining a plurality of electrical signals; a plurality of signal translating means coupling a plurality of the storage means output terminals to the signal combining means; and means for providing indications of the resultant electrical signals developed by the signal combining means.

38. Induction logging apparatus for investigating earth formations traversed by a borehole comprising: a coil system adapted for movement through the borehole; means for energizing the coil system with alternating current; circuit means coupled to the coil system for developing electrical signals proportional in magnitude to an electrical characteristic of the formation material at different depths in the borehole; signal storage means coupled to the circuit means and synchronized with the movement of the coil system through the borehole for producing at different storage means output terminals the simultaneous occurrence of signal portions corresponding to different depths in the borehole; means for combining a plurality of electrical signals; a plurality of signal translating means coupling a plurality of the storage means output terminals to the signal combining means; and means for providing indications of the resultant electrical signals developed by the signal combining means.

39. Induction logging apparatus for investigating earth formations traversed by a borehole comprising: a coil system adapted for movement through the borehole;

means for energizing the coil system with alternating current; circuit means coupled to the coil system for developing electrical signals proportional in magnitude to an electrical characteristic of the formation material at different depths in the borehole; signal storage means coupled to the circuit means and synchronized with the movement of the coil system through the borehole for producing at different storage means output terminals the simultaneous occurrence of signal portions obtained for selected depths in the borehole relative to one another; means for combining a plurality of electrical signals; a plurality of signal translating means coupling a plurality of the storage means output terminals to the signal combining means, at least two of these signal translating means including means for applying different gain factors to their respective signals; and means for providing indications of the resultant electrical signals developed by the signal combining means.

References Cited in the file of this patent

UNITED STATES PATENTS

| | | |
|---|---|---|
| 2,220,070 | Aiken | Nov. 5, 1940 |
| 2,582,314 | Doll | Jan. 15, 1952 |
| 2,723,375 | Schuster | Nov. 8, 1955 |
| 2,728,047 | Doll | Dec. 20, 1955 |
| 2,790,138 | Poupon | Apr. 23, 1957 |
| 2,794,966 | McCarty | June 4, 1957 |
| 2,836,359 | Mazzagatti | May 27, 1958 |
| 2,842,735 | Martin | July 8, 1958 |
| 2,882,988 | Dobrin | Apr. 21, 1959 |
| 2,908,889 | Piety | Oct. 13, 1959 |